United States Patent
Cai et al.

(10) Patent No.: US 12,445,295 B2
(45) Date of Patent: Oct. 14, 2025

(54) SYSTEMS AND METHODS OF SECURING VEHICLE SERVICES FROM DENIAL-OF-SERVICE ATTACKS USING DYNAMIC SIGNATURE

(71) Applicant: NIO Technology (Anhui) Co., Ltd., Anhui (CN)

(72) Inventors: Hao Cai, Sammamish, WA (US); Haiyong Xie, San Jose, CA (US); Qingyuan Wang, ShangHai (CN); Minzheng Zhao, ShangHai (CN)

(73) Assignee: NIO TECHNOLOGY (ANHUI) CO., LTD., Hefei (CN)

( * ) Notice: Subject to any disclaimer, the term of this patent is extended or adjusted under 35 U.S.C. 154(b) by 71 days.

(21) Appl. No.: 18/369,993

(22) Filed: Sep. 19, 2023

(65) Prior Publication Data
US 2025/0097047 A1    Mar. 20, 2025

(51) Int. Cl.
*H04L 29/06*    (2006.01)
*H04L 9/32*    (2006.01)
*H04L 47/122*    (2022.01)
*H04L 67/61*    (2022.01)

(52) U.S. Cl.
CPC .......... *H04L 9/3242* (2013.01); *H04L 9/3297* (2013.01); *H04L 47/122* (2013.01); *H04L 67/61* (2022.05)

(58) Field of Classification Search
None
See application file for complete search history.

(56) References Cited

U.S. PATENT DOCUMENTS

| | | | |
|---|---|---|---|
| 6,745,331 B1 * | 6/2004 | Silverbrook | H04L 9/3271 347/14 |
| 8,175,096 B2 | 5/2012 | Isobe | |
| 8,964,763 B2 | 2/2015 | Eswaran | |
| 9,203,771 B1 * | 12/2015 | Cai | H04L 45/38 |
| 10,873,533 B1 * | 12/2020 | Ismailsheriff | H04L 47/2441 |
| 10,932,135 B2 | 2/2021 | Han et al. | |

(Continued)

FOREIGN PATENT DOCUMENTS

EP    2887602    6/2015

OTHER PUBLICATIONS

Elagin, Vasiliy S. et al. The efficiency of the DPI system for identifying traffic and providing the quality of OTT services. 2018 Systems of Signals Generating and Processing in the Field of on Board Communications. https://ieeexplore.ieee.org/stamp/stamp.jsp?tp=&arnumber=8350589 (Year: 2018).*

(Continued)

*Primary Examiner* — Jeremiah L Avery
(74) *Attorney, Agent, or Firm* — Sheridan Ross P.C.

(57) ABSTRACT

Systems and methods include receiving sessions associated with a communication between a client and an in-vehicle application service, assigning received sessions with a quality of service (QoS) processing priority, collecting a flow signature of the sessions, generating an expected runtime flow signature based on the collected flow signature, comparing the flow signature of sessions with the expected runtime flow signature based on a time at which each of the sessions were received, promoting a QoS processing priority of a group of the sessions, and dropping sessions based on a QoS processing priority.

20 Claims, 7 Drawing Sheets

(56) References Cited

U.S. PATENT DOCUMENTS

| | | | | |
|---|---|---|---|---|
| 11,086,897 | B2* | 8/2021 | Ching | H04L 63/20 |
| 2011/0238855 | A1* | 9/2011 | Korsunsky | H04L 63/1441 |
| | | | | 709/231 |
| 2016/0080502 | A1* | 3/2016 | Yadav | H04L 47/825 |
| | | | | 709/227 |
| 2018/0309580 | A1* | 10/2018 | Jeon | H04L 9/0643 |
| 2019/0158294 | A1* | 5/2019 | Smith, III | H04L 9/3226 |
| 2019/0379683 | A1 | 12/2019 | Overby et al. | |
| 2021/0329087 | A1* | 10/2021 | Ciraci | H04L 45/742 |
| 2022/0247758 | A1* | 8/2022 | Du | H04L 63/1416 |
| 2023/0254338 | A1* | 8/2023 | Melicher | H04L 63/1483 |
| | | | | 726/13 |
| 2025/0097047 | A1* | 3/2025 | Cai | H04L 47/122 |

OTHER PUBLICATIONS

Yokota, Kenji et al. QoS control mechanism based on flow rate to improve quality of short flows and low-rate flows. 2010 IEEE Network Operations and Management Symposium—NOMS 2010. https://ieeexplore.ieee.org/stamp/stamp.jsp?tp=&arnumber=5488474 (Year: 2010).*

Elagin, V.S. et al. Modeling OTT services in multiservice networks in order to synchronize and prioritize traffic. 2018 Systems of Signal Synchronization, Generating and Processing in Telecommunications (SYNCHROINFO). https://ieeexplore.ieee.org/stamp/stamp.jsp?tp=&arnumber=8456968 (Year: 2018).*

Chen, Jie et al. Cross-layer design for QoS wireless communications. 2004 IEEE International Symposium on Circuits and Systems (ISCAS). https://ieeexplore.ieee.org/stamp/stamp.jsp?tp=&arnumber=1329247 (Year: 2004).*

Chen, Jie et al. Joint cross-layer design for wireless QoS content delivery. 2004 IEEE International Conference on Communications (IEEE Cat. No.04CH37577). https://ieeexplore.ieee.org/stamp/stamp.jsp?tp=&arnumber=1313348 (Year: 2004).*

Hariri, Salim et al. Quality-of-protection (QoP)-an online monitoring and self-protection mechanism. IEEE Journal on Selected Areas in Communications, vol. 23, Issue: 10. https://ieeexplore.ieee.org/stamp/stamp.jsp?tp=&arnumber=1514527 (Year: 2005).*

McNerney, Peter J.J.; Zhang, Ning. A study on reservation-based adaptation for QoS in adversarial MANET environments. 2012 8th International Wireless Communications and Mobile Computing Conference (IWCMC). https://ieeexplore.ieee.org/stamp/stamp.jsp?tp=&arnumber=6314286 (Year: 2012).*

McGrew et al., "State Management for Hash-Based Signatures", Cisco Systems USA, SSR-paper, TU Darmstadt, Germany, 17 pages, 2016.

International Search Report and Written Opinion for International (PCT) Patent Application No. PCT/IB2024/058701, dated Dec. 20, 2024 14 pages.

* cited by examiner

SYSTEMS AND METHODS OF SECURING VEHICLE SERVICES FROM DENIAL-OF-SERVICE ATTACKS USING DYNAMIC SIGNATURE

FIELD

The present disclosure is generally directed to vehicle systems, in particular, toward security of vehicle systems.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

Contemporary vehicles are becoming increasingly reliant on data from a variety of sensors and network locations or nodes, such as cloud-computing resources, to execute processes and enhance driving experiences. Advanced Driver-Assistance Systems (ADAS) is one example of such technology, using a wide range of sensors and data sources to improve vehicle safety and performance. However, such network nodes are vulnerable to attack from bad actors using denial of service (DOS) and distributed denial of service (DDOS) attack.

SUMMARY

As described above, transportation methods have changed substantially in recent years and contemporary vehicles are increasingly reliant on data from a variety of sensors and network locations or nodes, such as cloud-computing resources, to execute processes and enhance driving experiences. Because such network nodes are vulnerable to attack from bad actors using DoS and/or DDOS attacks, what is needed is a system for detecting such attacks and preventing such attacks from affecting the performance of systems.

While the systems and methods described herein refer generally to usage in the realm of vehicle systems, it should be appreciated the same or similar systems and methods may be utilized in non-vehicle-related systems, such as personal computers, servers, or other network-connected devices.

The present disclosure describes various embodiments of detecting and countering DoS and DDOS attacks using dynamically changing traffic flow signatures (referred to herein as dynamic signatures and/or expected runtime flow signatures) and associated packet filtering rules. In at least one embodiment, a system of a vehicle comprises one or more processors and a memory storing instructions that, when executed by the one or more processors, cause the system to: receive a first plurality of sessions and a second plurality of sessions associated with a communication between a client and an in-vehicle application service, wherein the first plurality of sessions are authenticated sessions with a first quality of service (QOS) processing priority; assign each of the received second plurality of sessions with a second QoS processing priority that is lower than the first QoS processing priority; collect a flow signature of each of the first plurality of sessions and each of the second plurality of sessions associated with the communication between the client and the in-vehicle application service; generate an expected runtime flow signature based on the collected flow signature of each of the first plurality of sessions associated with the communication between the client and the in-vehicle application service; compare the flow signature of each of the second plurality of sessions with the expected runtime flow signature based on a time at which each of the second plurality of sessions were received; promote the second QoS processing priority of a group of the second plurality of sessions to the first QoS processing priority; and drop the second plurality of sessions with the second QoS processing priority.

Aspects of the above system include wherein the flow signature of each of the first plurality of sessions includes information on virtual local area network, source Internet Protocol (IP) address, destination IP address, source port, destination port, sequence number, acknowledgement number, window size, selection of timestamp option, current timestamp, peer's used timestamp, hash key, cookies, selection of usage of cookie, hash signature inside timestamp option, or any combination thereof.

Aspects of the above system include wherein the generated expected runtime flow signature includes a sequence number range, an acknowledgement number range, or a combination thereof of an expected session that is expected to be received based on the time at which each of the second plurality of sessions was received.

Aspects of the above system include wherein the instructions further cause the system to detect that the system is under a congestion or overload that is above a pre-determined threshold.

Aspects of the above system include wherein the instructions further cause the system to update the generated expected runtime flow signature.

Aspects of the above system include wherein the instructions further cause the system to: write a hashed key signature to a timestamp option in a first packet; send the first packet; receive a second packet; and compare an echo timestamp of the second packet with the hashed key signature.

Aspects of the above system include wherein the system further comprises a first system component and a second system component, wherein the first system component is configured to receive the first plurality of sessions and the second plurality of sessions and assign each of the second plurality of sessions received at the first system component with the second QoS processing priority, and wherein the second system component is configured to compare the flow signature of each of the second plurality of sessions with the expected runtime flow signature, promote the second QoS processing priority of the group of the second plurality of sessions to the first QoS processing priority, and drop the second plurality of sessions with the second QoS processing priority.

Aspects of the above system include wherein the system further comprises a third system component and the third system component is configured to: collect the flow signature of each of the first plurality of sessions and each of the second plurality of sessions; and generate the expected runtime flow signature based on the collected flow signature of each of the first plurality of sessions.

Aspects of the above system include wherein the first component is configured to assign each of the received second plurality of sessions with the second QoS processing priority in response to instructions from the third component.

Aspects of the above system include wherein the generated expected runtime flow signature is offloaded by the third component to the second component.

Aspects of the above system include wherein the expected runtime flow signature is expected runtime dynamic session flow signature.

Aspects of the above system include wherein the instructions further cause the system to detect a congestion or overload experienced by the system is under a pre-determined threshold and remove the expected runtime flow signature.

Embodiments also include a computer-implemented method, the method comprising: receiving, via one or more processors, a first plurality of sessions and a second plurality of sessions associated with a communication between a client and an in-vehicle application service, wherein the first plurality of sessions are authenticated sessions with a first quality of service (QoS) processing priority; assigning, via the one or more processors, each of the received second plurality of sessions with a second QoS processing priority that is lower than the first QoS processing priority; collecting, via the one or more processors, a flow signature of each of the first plurality of sessions and each of the second plurality of sessions associated with the communication between the client and the in-vehicle application service; generating, via the one or more processors, an expected runtime flow signature based on the collected flow signature of each of the first plurality of sessions associated with the communication between the client and the in-vehicle application service; comparing, via the one or more processors, the flow signature of each of the second plurality of sessions with the expected runtime flow signature based on a time at which each of the second plurality of sessions were received; promoting, via the one or more processors, the second QoS processing priority of a group of the second plurality of sessions to the first QoS processing priority; and dropping, via the one or more processors, the second plurality of sessions with the second QoS processing priority.

Aspects of the above method include wherein the flow signature of each of the first plurality of sessions includes information on virtual local area network, source Internet Protocol (IP) address, destination IP address, source port, destination port, sequence number, acknowledgement number, window size, selection of timestamp option, current timestamp, peer's used timestamp, hash key, cookies, selection of usage of cookie, hash signature inside timestamp option, or any combination thereof.

Aspects of the above method include wherein the generated expected runtime flow signature includes a sequence number range, an acknowledgement number range, or a combination thereof of an expected session that is expected to be received based on the time at which each of the second plurality of sessions was received.

Aspects of the above method include the method further comprising updating the generated expected runtime flow signature.

Aspects of the above method include the method further comprising: detecting a congestion or overload experienced by the system is under a pre-determined threshold; and removing the expected runtime flow signature.

Aspects of the above method include the method further comprising: writing a hashed key signature to a timestamp option in a first packet; sending the first packet; receiving a second packet; and comparing an echo timestamp of the second packet with the hashed key signature.

Aspects of the above method include wherein the method is performed by a first system component, a second system component, and a third system component, wherein the first system component is configured to receive the first plurality of sessions and the second plurality of sessions and assign each of the second plurality of sessions received at the first system component with the second QoS processing priority, wherein the third system component is configured to collect the flow signature of each of the first plurality of sessions and each of the second plurality of sessions and generate the expected runtime flow signature based on the collected flow signature of each of the first plurality of sessions, and wherein the second system component is configured to compare the flow signature of each of the second plurality of sessions with the expected runtime flow signature, promote the second QoS processing priority of the group of the second plurality of sessions to the first QoS processing priority, and drop the second plurality of sessions with the second QoS processing priority.

Aspects of the above method include wherein the expected runtime flow signature is expected runtime dynamic session flow signature.

Additional features and advantages of the disclosed systems and methods will be set forth in the description that follows and in part will be apparent from the description or may be learned by practice of the invention. Advantages of the disclosed systems and methods will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

DETAILED DESCRIPTION

Figure 1:
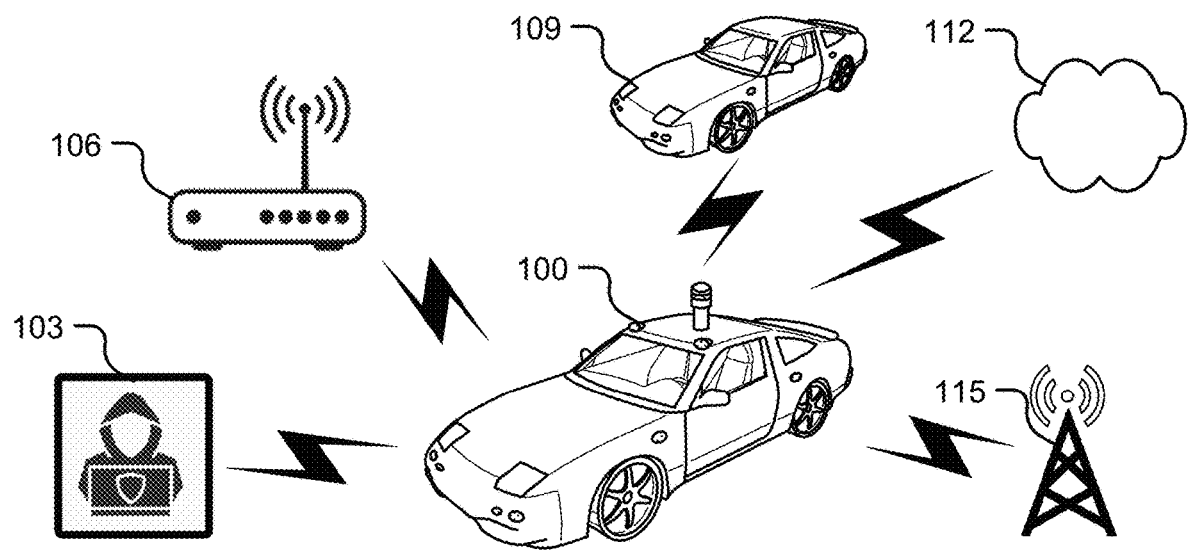
FIG. 1 shows a vehicle in accordance with embodiments of the present disclosure.

In recent years, the automotive industry has experienced a significant shift towards implementing advanced technologies to enhance vehicle safety, performance, and user experience. Vehicles are increasingly being equipped with sophisticated systems such as LiDAR, on-board diagnostics (OBD), cameras, cloud-based services or applications, and other sensors and network-connected data sources to aid drivers in various aspects of driving. LiDAR technology, for instance, enables vehicles to generate accurate 3D maps of their surroundings, providing real-time information on obstacles, pedestrians, and other vehicles. Such information is crucial for ADAS and the development of autonomous vehicles. OBD systems help drivers monitor vehicle performance by diagnosing issues and providing real-time feedback on various parameters such as engine temperature, emissions, and fuel efficiency. Cameras integrated with vehicles offer improved visibility, aiding in parking, lane departure warnings, and collision avoidance. Furthermore, cloud-based applications connect vehicles to a vast network of data, enabling features such as real-time traffic updates, remote diagnostics, and over-the-air software updates. Collectively, these technologies play a pivotal role in enhancing the overall driving experience while significantly improving vehicle safety and efficiency.

ADAS integrates data from various sensors, such as LiDAR, cameras, radar, ultrasonic sensors, and global positioning systems (GPSs), to provide features such as lane-keeping assistance, adaptive cruise control, automatic emergency braking, and blind-spot monitoring. Additionally, cloud-computing resources can provide real-time traffic information, weather updates, and map data, which can also be utilized by ADAS for better decision-making.

Apart from ADAS, other vehicle applications use data from sensors and network locations or nodes. For example, a vehicle may be equipped with sophisticated infotainment systems offering features like music streaming, navigation, voice assistance, and smartphone integration. Such systems rely on data from various sources, such as cloud applications, GPS satellites, and user devices.

OBD systems collect data from numerous sensors and electronic control units (ECUs) to monitor a vehicle's performance and detect potential issues. Such information can be sent to cloud-based applications for further analysis, enabling remote diagnostics and predictive maintenance, and such cloud-based applications may provide feedback in response.

A unified, or universal, diagnostic system, or service (UDS) of the vehicle may be a vehicle application which accesses cloud and local OBD data, allowing for diagnostic tools to access and interact with the vehicle's OBD system. A UDS vehicle application can access OBD data by establishing a communication channel with the vehicle's diagnostic system.

Vehicle-to-Everything (V2X) communication technology enables vehicles to communicate with other vehicles, infrastructure, and even pedestrians, using data from onboard sensors and external sources like traffic signals, smart city systems, and other connected vehicles. As a result, V2X can help improve traffic flow, reduce accidents, and enhance overall road safety.

Vehicle-to-Infrastructure (V2I) communication enables a vehicle to interact with traffic infrastructure, such as traffic lights, road signs, and traffic management systems. V2I technology can provide real-time information on traffic conditions, road closures, and alternate routes. For example, connected vehicles can receive network data from traffic signals about signal timings and adjust their speed accordingly to minimize stopping or idling at intersections. Additionally, V2I can alert drivers about upcoming hazards, such as sharp curves, slippery surfaces, or pedestrian crossings.

Vehicles may also employ fleet management systems that utilize data from GPS, vehicle sensors, and cloud-based applications to track vehicle location, monitor driver behavior, optimize routes, and manage fuel consumption. Electric vehicles rely on data from sensors and cloud-based applications to optimize battery usage, charging schedules, and energy management, ensuring efficient use of the vehicle's energy resources. Self-driving vehicles rely on an array of sensors, cameras, LiDAR, radar, and cloud-based data to navigate, make decisions, and interact with the environment safely.

However, the increasing reliance on such technologies using connected applications exposes a vehicle to potential risks from bad actors. Cybersecurity vulnerabilities in LiDAR, OBD systems, cameras, and cloud-based applications can be exploited to compromise the safety and functionality of vehicles. For instance, LiDAR and camera systems are susceptible to jamming or spoofing attacks, where attackers can feed false data to create illusions of obstacles, leading to incorrect decision-making by the vehicle's control systems. OBD systems, if not properly secured, can be hacked to gain unauthorized access to a vehicle's internal network, potentially allowing attackers to manipulate critical systems like brakes, steering, or engine control. Cloud-based applications, which rely on internet connectivity, are vulnerable to DoS or distributed denial of service DDOS attacks, wherein attackers flood the application with excessive traffic, rendering it unavailable to users. This could disrupt essential applications like real-time traffic updates, remote diagnostics, or over-the-air software updates. As a result, it is crucial for automakers and technology providers to prioritize the security of these systems and applications to ensure the safe and reliable operation of modern vehicles.

Conventional methods of preventing DOS or DDOS attacks often involve the use of firewalls, which serve as a protective barrier between the vehicle's internal network and external threats. Firewalls are designed to monitor and filter incoming and outgoing network traffic based on predefined security rules, thus helping to block malicious traffic or unauthorized access attempts. By implementing firewalls, automakers can mitigate the risks associated with potential attacks on vehicle systems, including LiDAR, OBD, cameras, and cloud-based applications. However, because advanced attacks include traffic pattern information which is the same as traffic pattern information of valid traffic, attacks are not distinguishable from valid traffic by conventional firewall rules. As a result, conventional systems for preventing DoS and DDOS attacks are inefficient and result in blocking valid traffic which reduces the effectiveness of the vehicle systems being attacked. With the rapid advancement of technology and the increasing sophistication of cyberattacks, it is essential for automakers and technology providers to continuously evolve their security strategies to ensure the safety and reliability of connected vehicles.

In various embodiments of the present disclosure, DoS and DDOS attacks can be detected and countered using dynamically changing traffic flow signatures (referred to herein as dynamic signatures and/or expected runtime flow signatures) and associated packet filtering rules. This is possible due in part to a limited number of pre-defined and pre-configured in-vehicle application applications (e.g., V2X applications, ADAS applications, cloud-initiated vehicle applications, remote and universal diagnostic services, and other vehicle applications and services) and authenticated sessions in a typical vehicle. Moreover, the various applications have different but relatively consistent and predictable session traffic behavior (e.g., packet transmission rates). For example, LiDAR, camera, radar, and other vehicle sensors typically transfer data at similar rates but such rates are different from the data transfer rates of an ADAS application. Knowing the traffic behavior of a selected session can enable an on-board vehicle server or network service manager (VNSM) to use, in periodic filtering of dynamic signatures, (a) a present packet acknowledgement (ACK) number and historic or customary or expected remote packet transmission rate to predict a packet sequence (SEQ) number window or range and/or (b) a present packet SEQ number and historic or customary or expected local packet transmission rate to predict a packet ACK number window or range to and/or from remote peers during a session. While an attacker may be capable of learning static session signatures and some historical dynamic signature information under close observation, such an attacker would be unable to inject packets with traffic flow signatures having packet header information falling within the window or range within the very small window of time available as the window moves dynamically. The dynamic signature can be used not only for filtering but also for Quality of Service (QOS) prioritization.

As a further indicator of an attack, communication nodes can alternatively or additionally exchange signatures or other secrets periodically that are hashed (or otherwise encrypted) and embedded by the vehicle manager and/or authenticated node into a packet header, payload, or trailer field (e.g., a timestamp option field or payload secret field). Such embedded secrets can act as a "fingerprint" indicating with a high degree of confidence that packets including the secret are valid while those not including the secret are invalid. These periodically changed "fingerprints," when chosen by an in-vehicle network security service manager, may be transparently embedded within one or more protocol header fields, for example a timestamp option header field, without requiring or affecting application awareness.

While the systems and methods described herein are described as being used by system components of a vehicle (including ports of a vehicle, an intelligent processing engine of a vehicle, and a vehicle network service manager), it should be appreciated that the same or similar systems and methods may be performed by system components of a computing device not in relation to any vehicle. For example, the systems and methods described herein may be used to avoid the impact of DoS and DDOS attacks on personal computing devices, servers, and/or other computing devices. As such, the systems and methods described herein should not be considered in any way as being limited to use in vehicles or by vehicle systems.

In some implementations, while various processes, functionalities, and architectures have been depicted in relation to system components of a vehicle, including ports, intelligent processing engines, and a vehicle network service manager, such descriptions are illustrative and not restrictive in nature. The underlying principles, mechanisms, and frameworks can be readily extended, adapted, or reconfigured to suit a plethora of other computing environments that might not necessarily be associated with vehicles.

For instance, systems and methods presented herein in the context of vehicular systems might equally be valuable when confronting DoS and/or DDOS attacks targeting personal computing devices, servers, and other computing apparatuses with or without modification. Therefore, any inference or presumption limiting the scope of the systems and methods discussed herein exclusively to vehicular contexts would be an oversimplification. The potential applications and utilities of these systems and methods span a broader horizon, encompassing a vast array of computing domains and scenarios beyond vehicles.

In one implementation, the vehicle manager identifies the in-vehicle authenticated service sessions and associated historic, present, customary, or expected packet flow signatures. Depending on the protocol, a flow signature can include Open System Interconnection (OSI) Layer 2 Virtual Local Area Network (VLAN) for ingress, OSI Layer 3 source and destination addresses, and OSI Layer 4 source and destination ports and SEQ and ACK numbers. Using this information, the manager can determine a valid ingress expected runtime data segment (or range) at any selected time to detect a session potentially under attack based on packet flow transmission rates (e.g., when a traffic flow for a particular type of session is determined to be above a selected threshold set by the range). In response to the potential attack, filtering rules for the session can be generated based on the run-time-flow signature to match the ingress traffic on the specific port(s) and applied continuously or discontinuously in response to the suspected attack. For persistent attacks, the filtering rules can be updated periodically with updated SEQ and ACK number windows and along with other dynamic signatures.

Applying the filtering rules, mismatched runtime flow signatures are assumed to be associated with an attack and either blocked or assigned a low QoS priority. Matching runtime flow signatures are assumed to be valid and passed or assigned a higher QoS priority. The use of QoS priority rather than packet blockage can enable potentially invalid packets to be dropped when under load associated with an attack but passed if not associated with an attack, thereby reducing the risk of data loss if the potentially invalid packet is mischaracterized. In this manner, attacks from a common OSI Layer 3 or 4 domain or source as that used by legitimate traffic or from an otherwise trusted vehicle on-board component (e.g., sensor) can be countered effectively.

A network security service manager, as described herein, may extract the application runtime authenticated session information and, embed traffic with dynamical flow signatures based on runtime session pattern, generate packet filtering rules and programs with QoS control action, and download them at various traffic ingress points such as switch ports, ethernet Network Interface Cards (NICs), and/or drivers for packet classification and actions. Such a system, as described herein, effectively offloads heavy traffic processing of threats and legitimate session data from attacked application service session endpoints away, and down to ingress ports/NICs with intelligent, dynamic OSI L2, L3 and L4 layer flow signature processing. Such a system, as described herein, effectively protects application services and sessions which, using conventional systems such as firewalls, would become unusable under such attacks in similar situations due to the large volume of threat data traffic processing. As a result, a system as described herein saves network bandwidth in-vehicle and precious CPU processing power for legitimate traffic.

Embodiments of the present disclosure will be described in connection with a vehicle, and in some embodiments, an electric vehicle, rechargeable electric vehicle, and/or hybrid-electric vehicle and associated systems. It is to be understood that the concepts of this disclosure can be employed in other contexts, whether or not involving a vehicle.

FIG. 1 shows a perspective view of a vehicle 100 in accordance with embodiments of the present disclosure. Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of providing data over a network to assist vehicle applications in performing operations such as autonomous or semi-autonomous control of driving operations. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), light detection and ranging (LiDAR) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space of the vehicle 100 and/or on an outside of the vehicle 100. In some embodiments, the sensors and systems may be disposed in one or more portions of a vehicle 100 (e.g., the frame, a body panel, a compartment, etc.). As described herein, sensors which provide data to vehicle applications may also be external to the vehicle. For example, V2X and/or V2I technologies may be used in relation to receiving network data from network nodes external to the vehicle.

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally, or alternatively, data from sensors and systems described herein may be used by one or more ADASs, driving applications, cockpit applications, and other systems and applications associated with a vehicle 100. In any event, the sensors and systems may be used to provide driving assistance at any level of operation (e.g., from fully-manual to fully autonomous operations, etc.) as described herein.

Rapid advancements in automotive technology have led to the development of a wide range of vehicle applications and applications aimed at enhancing the driving experience, safety, and convenience for drivers and passengers. These applications and applications, such as ADAS, driving apps, and cockpit apps, rely on data from various systems and sensors, including LiDAR, OBD, radar, cameras, V2I, V2X, and cloud-based applications, to provide real-time information and assistance to drivers.

ADAS refers to a suite of advanced safety features designed to assist drivers in various aspects of driving, such as adaptive cruise control, lane departure warnings, blind-spot monitoring, and collision avoidance systems. An ADAS as described herein uses data from LiDAR, radar, image sensors, and other sensors, onboard and/or external to the vehicle. Using such data, an ADAS can detect and respond to potential hazards, ultimately reducing the likelihood of accidents and improving overall road safety. As ADAS technologies continue to evolve, they play a critical role in the development of autonomous vehicles, paving the way for a future of safer and more efficient transportation. As described herein, an ADAS can continue to operate even when a connected system such as LiDAR, radar, image sensors, etc., are under a DoS or DDOS attack.

Driving apps encompass a broad range of applications that provide drivers with useful information and tools to enhance their driving experience. Driving apps as described herein may include, for example, navigation and mapping applications, real-time traffic updates, fuel efficiency monitoring, and vehicle diagnostics, among others. Driving apps may use data from various sensors, V2I, V2X, and cloud-based applications, to provide context-aware assistance to a driver or the vehicle, such as by aiding a driver in making informed decisions on the road. As described herein, driving apps of a vehicle can continue to operate even when a connected system such as LiDAR, radar, image sensors, V2I, V2X, and cloud-based applications etc., are under a DoS or DDOS attack.

Cockpit apps as described herein may provide in-vehicle experiences for drivers and passengers of a vehicle. Cockpit apps may provide infotainment, climate control, customizable digital instrument clusters, and other features. Cockpit apps may use data from various sensors and cloud-based applications to offer a seamless and personalized experience to vehicle users. As described herein, cockpit apps of a vehicle can continue to operate even when a connected system such as LiDAR, radar, image sensors, V2I, V2X, and cloud-based applications etc., are under a DOS or DDOS attack.

The various levels of vehicle control and/or operation can be described as corresponding to a level of autonomy associated with a vehicle 100 for vehicle driving operations. For example, a vehicle may be operable to be controlled in a partial automation level in which the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle.

The vehicle may also or alternatively be operable to be controlled in a full automation level in which the vehicle may continually monitor traffic, vehicular, roadway, and/or environmental conditions while driving the vehicle. It should be appreciated that at any level of control, the vehicle, and/or one or more automated driving systems associated with the vehicle, may monitor the driving operations of the vehicle and the driving environment.

Any such systems, sensors, network nodes, etc., as illustrated in FIG. 1 and/or as described herein may be vulnerable to DoS and/or DDOS attacks from any number of sources, such as active hackers or bad actors 103, network devices 106, other vehicles 109, devices connected to the vehicle via the Internet 112 or another network, such as devices connected to the vehicle via a cellular network 115. As should be appreciated, the attacks described herein may originate from any number of computing systems or devices and may reach the vehicle 100 via any number of communication channels. Using a system or method as described herein, data from such systems, sensors, network nodes, etc., may be filtered in the case of a potential DoS and/or DDOS attack to prevent such attacks from affecting vehicle applications such as ADAS and other systems.

Figure 2:
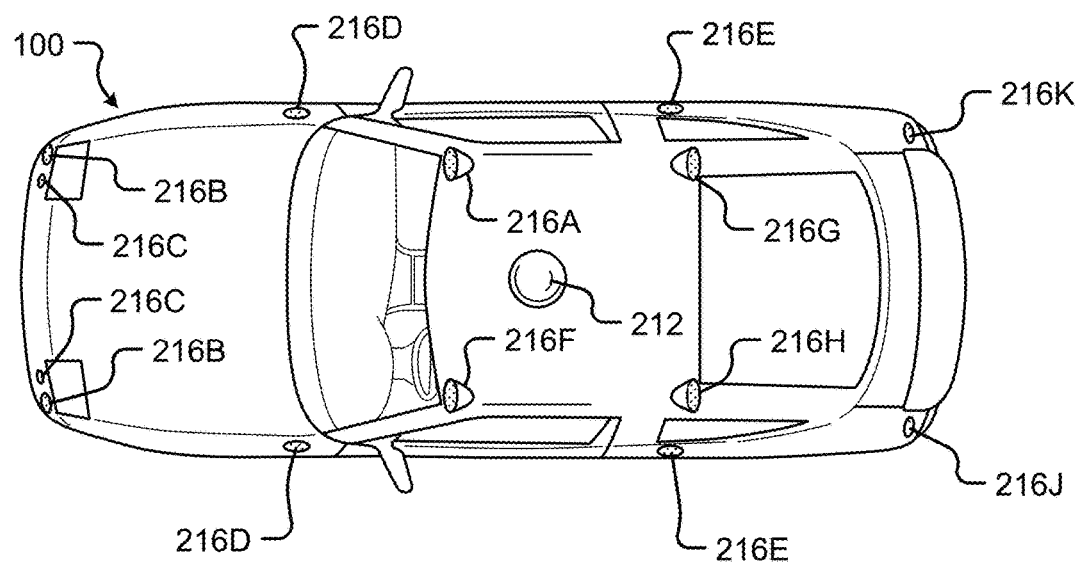
FIG. 2 shows a plan view of the vehicle in accordance with at least some embodiments of the present disclosure.

As shown in FIG. 2, the vehicle 100 may, for example, include at least one of a ranging and imaging system 212 (e.g., LIDAR, etc.), an imaging sensor 216A, 216F (e.g., camera, IR, etc.), a radio object-detection and ranging system sensors 216B (e.g., RADAR, RF, etc.), ultrasonic sensors 216C, and/or other object-detection sensors 216D, 216E. In some embodiments, the imaging system 212 and/or sensors may be mounted on a roof of the vehicle 100. In one embodiment, the RADAR sensors 216B may be disposed at least at a front, aft, or side of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 216A-K, 212 illustrated in FIGS. 1 and 2 may be disposed in, on, and/or about the vehicle 100 in any position, area, and/or zone of the vehicle 100. Any such systems, sensors, network nodes, etc., as illustrated in FIG. 1 and/or as described herein may be vulnerable to DoS and/or DDOS attacked. Using a system or method as described herein, data from such systems, sensors, network nodes, etc., may be filtered in the case of a potential DoS and/or DDOS attack to prevent such attacks from affecting vehicle applications such as ADAS and other systems.

Referring again to FIG. 2, a plan view of a vehicle 100 will be described in accordance with embodiments of the present disclosure. In particular, FIG. 2 shows a vehicle sensing environment at least partially defined by the sensors and systems 216A-K, 212 disposed in, on, and/or about the vehicle 100. Each sensor 216A-K may include an operational detection range and operational detection angle.

In some embodiments, the vehicle 100 may include a ranging and imaging system 212 such as LiDAR, or the like. The ranging and imaging system 212 may be configured to detect visual information in an environment surrounding the vehicle 100. The visual information detected in the environment surrounding the ranging and imaging system 212 may be processed (e.g., via one or more sensor and/or system processors, etc.) to generate a complete 360-degree view of an environment around the vehicle.

Sensor data and information may be collected by one or more sensors or systems 216A-K, 212 of the vehicle 100 monitoring the vehicle sensing environment. This information may be processed (e.g., via a processor, computer-vision system, etc.) to determine targets (e.g., objects, signs, people, markings, roadways, conditions, etc.) inside one or more detection zones associated with the vehicle sensing environment.

The vehicle 100 may include a number of sensors 216E, 216G, 216H, 216J, 216K disposed proximal to the rear of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 216E, 216G, 216H, 216J, 216K may detect targets near or approaching the rear of the vehicle 100. For example, another vehicle approaching the rear of the vehicle 100 may be detected by one or more of the ranging and imaging system 212 (e.g., LiDAR), rear-view camera image sensors 216G, 216H, and/or rear facing RADAR sensors 216J, 216K. As another example, the vehicle 100 may be driving and one or more of the ranging and imaging system 212, front-facing cameras 216A, 216F, front-facing RADAR sensors 216B, and/or ultrasonic sensors 216C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 212, and/or the side-facing sensors 216D, 216E (e.g., RADAR, ultrasonic, camera, combinations thereof, and/or other type of sensor), may detect targets at a side of the vehicle 100.

Any such systems, sensors, network nodes, etc., as illustrated in FIG. 2 and/or as described herein may be vulnerable to DoS and/or DDOS attacked. Using a system or method as described herein, data from such systems, sensors, network nodes, etc., may be filtered in the case of a potential DoS and/or DDOS attack to prevent such attacks from affecting vehicle applications such as ADAS and other systems.

Figure 3:
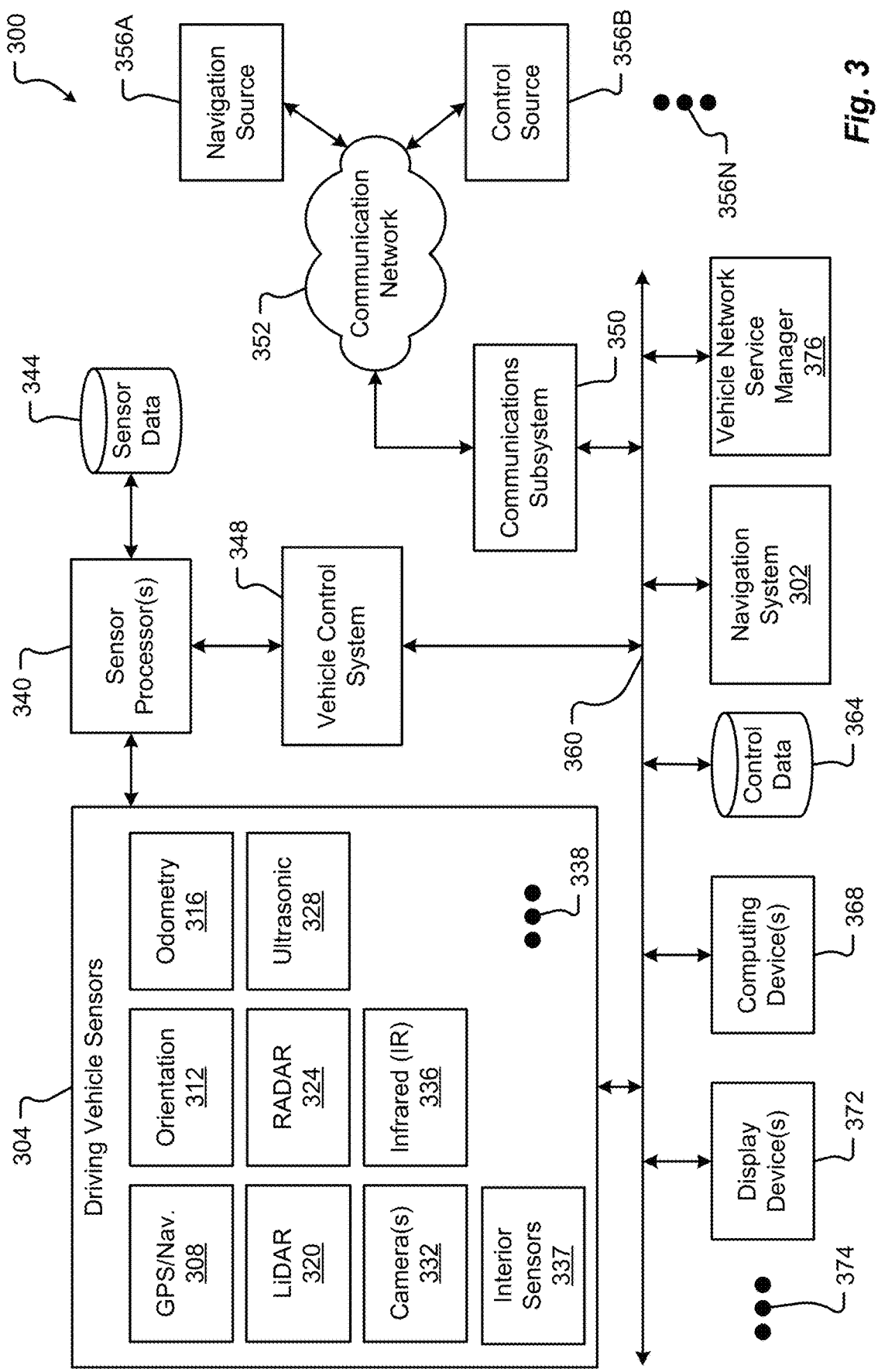
FIG. 3 is a block diagram of an embodiment of a communication system of the vehicle in accordance with embodiments of the present disclosure.

FIG. 3 is a block diagram of an embodiment of a communication system 300 of the vehicle 100 in accordance with embodiments of the present disclosure. The communication system 300 may include one or more driving vehicle sensors and systems 304, sensor processors 340, sensor data memory 344, vehicle control system 348, communications subsystem 350, control data memory 364, computing devices 368, display devices 372, VNSMs 376, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N. For example, a communication subsystem 350, as illustrated in greater detail in FIG. 4 and as described in greater detail below, may be capable of receiving data from network nodes, such as data from systems, sensors, and/or network locations, filtering the data, and transmitting the data to vehicle services in accordance with embodiments of the present disclosure described herein.

In accordance with at least some embodiments of the present disclosure, the communication network 352 may include any type of known communication medium or collection of communication media and may use any type of protocols, such as session initiation protocol (SIP), transport communication protocol (TCP), Internet protocol (IP), synchronous network architecture (SNA), internetwork packet exchange (IPX), AppleTalk, and the like, to transport messages between endpoints. The communication network 352 may include wired and/or wireless communication technologies. The Internet is an example of the communication network 352 that constitutes an IP network consisting of many computers, computing networks, and other communication devices located all over the world, which are connected through many telephone systems and other means. Other examples of the communication network 352 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network (VPN); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be any one or more of a number of different networks and/or network types. The communication network 352 may be any one or more of a number of different communication media such as coaxial cable, copper cable/wire, fiber-optic cable, antennas for transmitting/receiving wireless messages, and combinations thereof. Any such protocols and communication methods may be used in relation to the packet filtering methods and systems described herein.

As illustrated in FIG. 3, the driving vehicle sensors and systems 304 may include at least one navigation sensor 308 (e.g., GPS), orientation sensor 312, odometry sensor 316, LiDAR 320, RADAR sensors 324, ultrasonic sensors 328, camera sensors 332, IR sensors 336, one or more interior sensors 337, and/or other sensors or systems 338. These driving vehicle sensors and systems 304 may be similar, if not identical, to the sensors and systems 216A-K, 212 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100.

The orientation sensor 312 may include one or more sensors configured to determine an orientation of the vehicle 100 relative to at least one reference point.

The odometry sensor 316 and/or system may include one or more components that are configured to determine a change in position of the vehicle 100 over time. In some embodiments, the odometry sensor 316 may utilize data from one or more other sensors and/or systems 304 in determining a position (e.g., distance, location, etc.) of the vehicle 100 relative to a previously measured position for the vehicle 100. Additionally, or alternatively, the odometry sensors 316 may include one or more encoders, Hall speed sensors, and/or other measurement sensors/devices configured to measure a wheel speed, rotation, and/or number of revolutions made over time.

The LiDAR sensor/system 320 may include one or more components configured to measure distances to targets using laser illumination. In some embodiments, the LiDAR sensor/system 320 may provide 3D imaging data of an environment around the vehicle 100. The imaging data may be processed to generate a full 360-degree view of the environment around the vehicle 100. The LiDAR sensor/system 320 may include a laser light generator configured to generate a plurality of target illumination laser beams (e.g., laser light channels).

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets.

The camera sensors 332 may include one or more components configured to detect image information associated with an external environment of the vehicle 100. In some embodiments, the camera sensors 332 may include a lens, filter, image sensor, and/or a digital image processer. It is an aspect of the present disclosure that multiple camera sensors 332 may be used together to generate stereo images providing depth measurements.

The IR sensors 336 may include one or more components configured to detect image information associated with an external environment of the vehicle 100. The IR sensors 336 may be configured to detect targets in low-light, dark, or poorly lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.).

In some embodiments, the driving vehicle sensors and systems 304 may include other sensors or systems 338 and/or combinations of the sensors 306-337 described above. Additionally, or alternatively, one or more of the sensors 306-337 described above may include one or more processors configured to process and/or interpret signals detected by the one or more sensors 306-337. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random-access memory ("RAM") and/or a read-only memory ("ROM"), which can be programmable, flash-updateable, and/or the like.

Once handled by the communications subsystem 350, the data from the interior sensors 337 and/or other sensors and data sources described herein may be transmitted to destination vehicle applications to execute functions. For example, a vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle.

In some embodiments, the vehicle control system 348 may correspond to one or more computing systems that control driving operations of the vehicle 100 in accordance with the Levels of driving autonomy described above. In one embodiment, the vehicle control system 348 may operate at a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

In some embodiments, the one or more components of the vehicle 100 (e.g., the driving vehicle sensors and systems 304, vehicle control system 348, display devices 372, etc.) may communicate across the communication network 352 external to the vehicle to one or more entities 356A-N via a communications subsystem 350 of the vehicle 100. Embodiments of the communications subsystem 350 are described in greater detail in conjunction with FIG. 5.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random-access memory (RAM) and/or a read-only memory (ROM), which can be programmable, flash-updateable, and/or the like.

Because the data sources used by vehicle applications are vulnerable to attack, such information associated with controlling driving operations of the vehicle 100 may be filtered by the communications subsystem 350 as described herein to avoid negative impact of such attacks affecting vehicle applications.

In addition to the components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc. User interface devices, as data sources connected to the bus 360, are also vulnerable to attack from bad actors. As such, systems and methods of filtering data as described herein may be used in relation to data received from user interface devices.

Environmental sensors may include sensors configured to collect data relating to the internal environment of a vehicle 100. Examples of environmental sensors may include one or more of but are not limited to: oxygen/air sensors, temperature sensors, humidity sensors, light/photo sensors, and more.

User interface sensors may include sensors configured to collect data relating to one or more users (e.g., a driver and/or passenger(s)) in a vehicle 100. As can be appreciated, the user interface sensors may include sensors that are configured to collect data from users in one or more areas of the vehicle 100. Examples of user interface sensors may include one or more of, but are not limited to: infrared sensors, motion sensors, weight sensors, wireless network sensors, biometric sensors, camera (or image) sensors, audio sensors, and more.

Infrared sensors used within the vehicle 100 may be used to measure IR light irradiating from at least one surface, user, or another object in the vehicle 100. Among other things, the Infrared sensors may be used to measure temperatures, form images (especially in low light conditions), identify users, and even detect motion in the vehicle 100.

The motion sensors may detect motion and/or movement of objects inside the vehicle. Optionally, the motion sensors may be used alone or in combination to detect movement. For example, a user may be operating a vehicle 100 (e.g., while driving, etc.) when a passenger in the rear of the vehicle 100 unbuckles a safety belt and proceeds to move about the vehicle 100. In this example, the movement of the passenger could be detected by the motion sensors.

Weight sensors may be employed to collect data relating to objects and/or users in various areas of the vehicle 100. In some cases, the weight sensors may be included in the seats and/or floor of a vehicle 100.

The vehicle 100 may include a wireless network sensor. A wireless network sensor may be configured to detect one or more wireless network(s) inside the vehicle 100. Examples of wireless networks may include, but are not limited to, wireless communications utilizing Bluetooth®, Wi-Fi™, ZigBee, IEEE 802.11, and other wireless technology standards.

Biometric sensors may be employed to identify and/or record characteristics associated with a user. It is anticipated that biometric sensors can include at least one of image sensors, IR sensors, fingerprint readers, weight sensors, load cells, force transducers, heart rate monitors, blood pressure monitors, and the like as provided herein.

The in-vehicle camera sensors may record still images, video, and/or combinations thereof. Camera sensors may be used alone or in combination to identify objects, users, and/or other features inside the vehicle 100. Two or more camera sensors may be used in combination to form, among other things, stereo and/or three-dimensional (3D) images. The stereo images can be recorded and/or used to determine depth associated with objects and/or users in a vehicle 100. Further, the camera sensors used in combination may determine the complex geometry associated with identifying characteristics of a user. The camera sensors may also be used to determine movement associated with objects and/or users within the vehicle 100. It should be appreciated that the number of image sensors used in a vehicle 100 may be increased to provide greater dimensional accuracy and/or views of a detected image in the vehicle 100.

The audio sensors may be configured to receive audio input from a user of the vehicle 100. The audio input from a user may correspond to voice commands, conversations detected in the vehicle 100, phone calls made in the vehicle 100, and/or other audible expressions made in the vehicle 100.

The safety sensors may include sensors configured to collect data relating to the safety of a user and/or one or more components of a vehicle 100. Examples of safety sensors may include one or more of, but are not limited to: force sensors, mechanical motion sensors, orientation sensors, restraint sensors, and more.

The force sensors may include one or more sensors inside the vehicle 100 configured to detect a force observed in the vehicle 100. One example of a force sensor may include a force transducer that converts measured forces (e.g., force, weight, pressure, etc.) into output signals. Mechanical motion sensors may correspond to encoders, accelerometers, damped masses, and the like.

The restraint sensors may correspond to sensors associated with one or more restraint devices and/or systems in a vehicle 100. Seatbelts and airbags are examples of restraint devices and/or systems.

The associated device sensors can include any sensors that are associated with a device in the vehicle 100. As previously stated, typical devices may include smart phones, tablets, laptops, mobile computers, and the like. Various sensors may be associated with these devices can be employed by the vehicle control system 348. For example, a typical smart phone can include an image sensor, an IR sensor, audio sensor, gyroscope, accelerometer, wireless network sensor, fingerprint reader, and more. It is an aspect of the present disclosure that one or more of these associated device sensors may be used by one or more subsystems of the vehicle 100.

A navigation system 302 can include any hardware and/or software used to navigate the vehicle either manually or autonomously. For example, the navigation system 302 may be capable of receiving data from network nodes, such as cloud-computing databases with traffic information to perform a process of navigating the vehicle and/or providing navigation instructions or recommendations to a driver. A navigation system 302 as described herein can be any present or future-built navigation system that may use location data, for example, from the GPS, to provide navigation information or control the vehicle 100. The navigation system 302 can include several components, such as, one or more of, but not limited to: a GPS Antenna/receiver, a location module, a maps database, etc. Generally, the GPS Antenna/receiver, location module, maps database, and/or other components or modules described herein may be hardware, software, firmware, computer readable media, or combinations thereof.

The location module can be the controller of the satellite navigation system designed for use in the vehicle 100. The location module can acquire position data, as from the GPS Antenna/receiver, to locate the user or vehicle 100 on a road in the unit's map database. Using the road database, the location module can give directions to other locations along roads also in the database.

The vehicle control system 348, when operating in L4 or L5 and based on sensor information from the external and interior vehicle sensors, can control the driving behavior of the vehicle in response to the current vehicle location, sensed object information, sensed vehicle occupant information, vehicle-related information, exterior environmental information, and navigation information from a maps database.

In a typical implementation, the automated vehicle control system 348, based on feedback from certain sensors, specifically the LiDAR and radar sensors positioned around the circumference of the vehicle, constructs a three-dimensional map in spatial proximity to the vehicle that enables the automated vehicle control system 348 to identify and spatially locate animate and inanimate objects. Other sensors, such as inertial measurement units, gyroscopes, wheel encoders, sonar sensors, motion sensors to perform odometry calculations with respect to nearby moving exterior objects, and exterior facing cameras (e.g., to perform computer vision processing) can provide further contextual information for generation of a more accurate three-dimensional map. The navigation information is combined with the three-dimensional map to provide short, intermediate, and long-range course tracking and route selection. The vehicle control system 348 processes real-world information as well as GPS data and driving speed to determine accurately the precise position of each vehicle, down to a few centimeters all while making corrections for nearby animate and inanimate objects.

The vehicle control system 348 can process in substantial real time the aggregate mapping information and models (or predicts) behavior of occupants of the current vehicle and other nearby animate or inanimate objects and based on the aggregate mapping information and modeled behavior, issues appropriate commands regarding vehicle operation.

Data from any of the communication system 300 or interior sensors 337 illustrated in FIG. 3 may be vulnerable to DoS or DDOS attacks from bad actors. As such, the systems and methods of filtering data may be performed in relation to the communication system 300 or interior sensors 337. As a result, using a system or method as described herein, DoS and DDOS attacks may be prevented from affecting the performance of vehicle applications which rely on such interior sensors 337.

Figure 4:
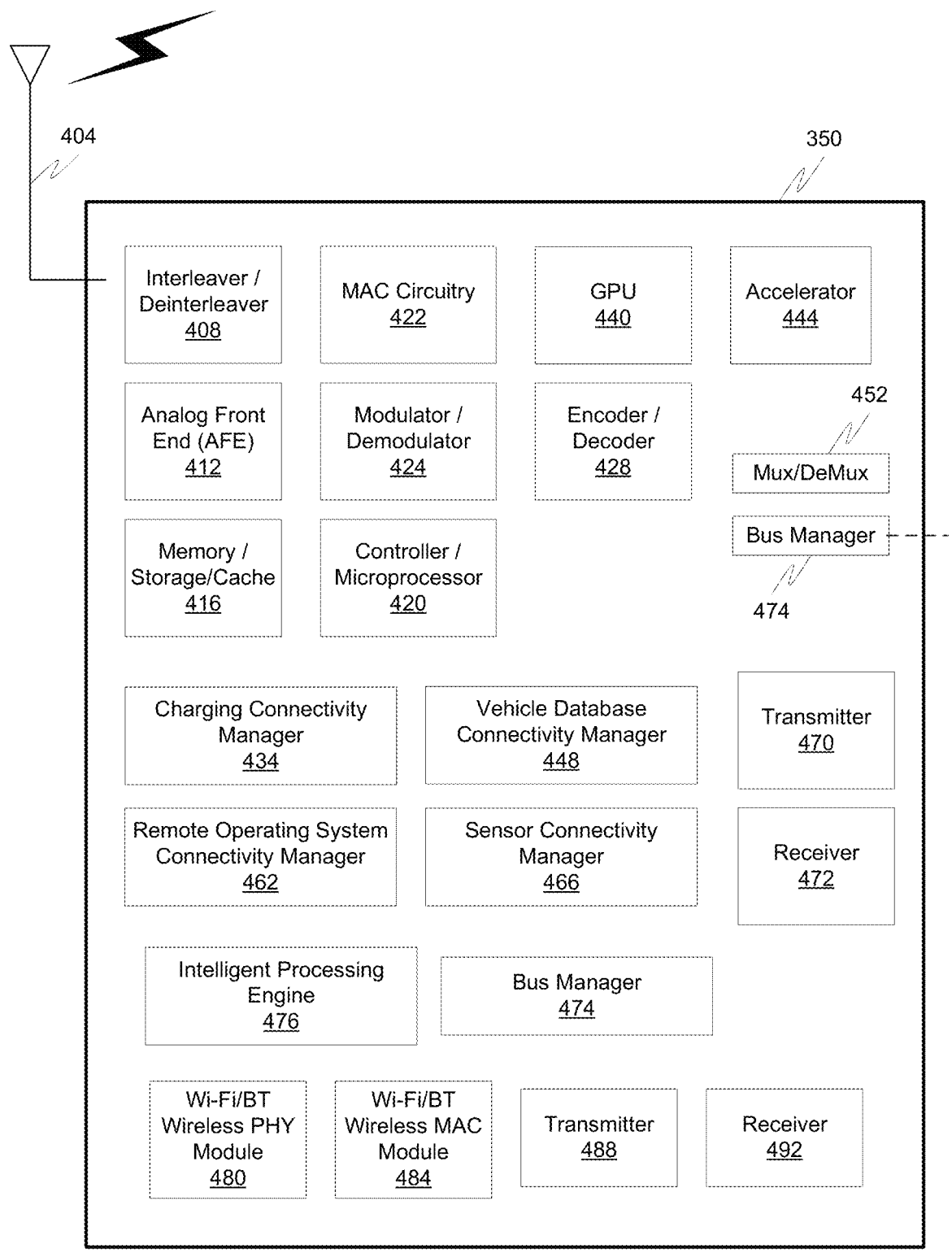
FIG. 4 is a block diagram of an embodiment of a communications subsystem of the vehicle.

FIG. 4 illustrates a hardware diagram of communications componentry that can be optionally associated with the vehicle 100 in accordance with embodiments of the present disclosure. The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

As shown in FIG. 4, the communications subsystem 350 can include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 474), including one or more of Controller Area Network (CAN) bus, Domestic Digital Bus (D2B), Local Interconnect Network (LIN), Media Oriented Systems Transport (MOST), Multifunction Vehicle Bus, Vehicle Area Network (VAN), and the like or in general any communications protocol and/or standard(s).

The various protocols and communications can be communicated one or more wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any of the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 404, an interleaver/deinterleaver 408, an analog front end (AFE) 412, memory/storage/cache 416, controller/microprocessor 420, MAC circuitry 422, modulator/demodulator 424, encoder/decoder 428, a plurality of connectivity managers 434, 448, 462, 466, GPU 440, accelerator 444, a multiplexer/demultiplexer 452, transmitter 470, receiver 472 and additional wireless radio components such as a Wi-Fi PHY/Bluetooth® module 480, a Wi-Fi/BT MAC module 484, additional transmitter(s) 488 and additional receiver(s) 492. The various elements in the communication subsystem 350 are connected by one or more links/buses 5 (not shown, again for sake of clarity).

The various connectivity managers 434, 448, 462, 466 may manage and/or coordinate communications between the communication subsystem 350 and one or more of the systems disclosed herein and one or more other devices/systems. The connectivity managers 434, 448, 462, 466 include a charging connectivity manager 434, a vehicle database connectivity manager 448, a remote operating system connectivity manager 462, and a sensor connectivity manager 466. The charging connectivity manager 434 may coordinate physical connectivity between the vehicle 100 and a charging device/vehicle and may communicate with one or more of a power management controller, one or more third parties and optionally a billing system(s).

The vehicle database connectivity manager 448 may allow the subsystem 350 to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver, and/or a dealer or service/maintenance provider, uses to track information about the vehicle 100. In general, any information stored in the vehicle database can optionally be shared with any one or more other devices optionally subject to any privacy or confidentiality restrictions.

The communication subsystem 350 can have one more antennas 404, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 404 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 404 generally interacts with the AFE 412, which is needed to enable the correct processing of the received modulated signal and signal conditioning for a transmitted signal. The AFE 412 can be functionally located between the antenna and a digital baseband system in order to convert the analog signal into a digital signal for processing and vice-versa.

The communication subsystem 350 can also include a controller/microprocessor 420 and a memory/storage/cache 416. The subsystem 350 can interact with the memory/storage/cache 416 which may store information and operations necessary for configuring and transmitting or receiving the information described herein. The memory/storage/cache 416 may also be used in connection with the execution of application programming or instructions by the controller/microprocessor 420, and for temporary or long-term storage of program instructions and/or data. As examples, the memory/storage/cache 416 may include a computer-readable device, RAM, ROM, DRAM, SDRAM, and/or other storage device(s) and media.

The controller/microprocessor 420 may include a general-purpose programmable processor or controller for executing application programming or instructions related to the communication subsystem 350. Furthermore, the controller/microprocessor 420 can perform operations for configuring and transmitting/receiving information as described herein. The controller/microprocessor 420 may include multiple processor cores, and/or implement multiple virtual processors. Optionally, the controller/microprocessor 420 may include multiple physical processors. By way of example, the controller/microprocessor 420 may include a specially configured application specific integrated circuit (ASIC) or other integrated circuit, a digital signal processor(s), a controller, a hardwired electronic or logic circuit, a programmable logic device or gate array, a special purpose computer, or the like.

The communication subsystem 350 can further include a transmitter(s) 470, 488 and receiver(s) 472, 492 which can transmit and receive signals, respectively, to and from other devices, subsystems and/or other destinations using the one or more antennas 404 and/or links/busses. Included in the subsystem 350 circuitry is the medium access control or MAC Circuitry 422. MAC circuitry 422 provides for controlling access to the wireless medium. In an exemplary embodiment, the MAC circuitry 422 may be arranged to contend for the wireless medium and configure frames or packets for communicating over the wired/wireless medium.

The communication subsystem 350 can also optionally contain a security module (not shown). This security module can contain information regarding but not limited to, security parameters required to connect the device to one or more other devices or other available network(s), and can include WEP, WPA/WPA-2, AES, and/or TKIP security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 440, an accelerator 444, a Wi-Fi/BT/Bluetooth® Low-Energy (BLE) PHY module 50480 and a Wi-Fi/BT/BLE MAC module 484 and optional wireless transmitter 488 and optional wireless receiver 492. In some embodiments, the GPU 440 may be a graphics processing unit, or visual processing unit, including at least one circuit and/or chip that manipulates and changes memory to accelerate the creation of images in a frame buffer for output to at least one display device. The GPU 440 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The communication subsystem 350 may also include one or more intelligent processing engines 476. An intelligent processing engine 476 as described herein may facilitate communication between various data sources on-board and off the vehicle and vehicle applications such as ADAS. The intelligent processing engine 476 may interconnect different ECUs, sensors, and vehicle applications through dedicated ports or wireless interfaces. The intelligent processing engine 476 may be capable of routing data packets between such components, ensuring seamless data exchange and real-time processing for various vehicle applications. In some embodiments, the intelligent processing engine 476 may include a high performance ethernet switch capable of using rule-based frame parsing, matching, and QoS handling actions. The intelligent processing engine 476 may implement software and/or hardware packet filtering to implement packet filtering rules as described herein. The intelligent processing engine 476 may be capable of parsing and matching packets to rules at wire rate.

The intelligent processing engine 476, may include or be in communication with multiple ports or interfaces for connecting various data sources, including LiDAR sensors, cameras, radar sensors, and cloud-based applications, and may be enabled to handle a diverse range of data types and formats, facilitating seamless communication between different vehicle applications.

As described herein, the intelligent processing engine 476 may provide QoS support by prioritizing different types of data based on their importance or time-sensitivity. The intelligent processing engine 476 may be used in relation to the systems and methods described herein to implement security features such as through packet filtering via dynamic filtering rules to protect the vehicle's network from unauthorized access or malicious attacks.

QOS handling actions as described herein may include lowering QoS priority of traffic from an ingress which does not match a dynamic signature such that the traffic will have a lower QoS handling priority than authentic traffic which matches the dynamic signature. As a result, for traffic egressing to the same vehicle application network destination, if the destination is under congestion or overloaded, the intelligent processing engine 476 or the vehicle application may drop the QoS traffic with lower QoS handling priority. In this way, all matched authenticated traffic will pass to the vehicle application and traffic created by a bad actor can be dropped. As a result, the vehicle application can operate without being impacted by a DDOS or other type of attack. If the application, service, or system becomes congested and overloaded, the attack traffic will be identified and discarded. In this way, an attack may be prevented from significantly degrading performance of the system, consuming network bandwidth, and burdening the processing capabilities of the driver, thereby enhancing security and stability of the system.

An intelligent processing engine 476 may be configured to determine a destination for each packet based on information present in the header such as a destination address. Determining the destination may involve consulting an internal routing table or using other routing algorithms to identify the correct output port and the most efficient path for the data packet to reach its destination.

After determining the destination, intelligent processing engine 476 may forward the packet to its respective destination, either to a destination within the vehicle's internal network or to external cloud-based data sources. This process ensures that data is exchanged efficiently and securely among the different vehicle systems and applications, ultimately enhancing the overall performance, safety, and user experience of the connected vehicle.

As described herein, an intelligent processing engine 476 may perform packet filtering based on predefined filtering rules or policies. Packet filtering as described herein improves network security, maintains the desired QoS for various vehicle systems, and efficiently manages the data traffic flowing through the intelligent processing engine 476.

The intelligent processing engine 476 may perform packet filtering by examining incoming and outgoing data packets to determine whether each packet should be allowed to pass through or be treated as an exception based on set rules. Packets treated as an exception may be dropped. The rules may include criteria such as source and destination addresses, protocol types, port numbers, and other header information. As described herein, a rule may include a dynamic signature range. For instance, intelligent processing engine 476 may be configured to block all incoming traffic from a specific IP address which includes dynamic information within the dynamic signature range.

In some cases, an intelligent processing engine 476 may utilize one or more access control lists (ACLs) to define filtering rules. ACLs are a set of rules which can be used by an intelligent processing engine 476 to determine actions to be taken for each packet based on header information. When a packet arrives at the intelligent processing engine 476, the packet may be compared against the ACL rules, and if a match is found, the corresponding action (e.g., allow or deny) is applied. ACLs can be configured to provide granular control over network traffic, ensuring that only authorized communication takes place between the various vehicle systems and applications.

Additionally, an intelligent processing engine 476 may employ advanced filtering techniques, such as stateful inspection, in which stateful information in packets is inspected, deep packet inspection (DPI), or the use of dynamic signatures as described herein to analyze contents of the packets and make more informed decisions based on the packet's payload, further enhancing network security and traffic management.

The remote operating system connectivity manager 462 may facilitate communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 466 which may facilitate communications between any one or more of the vehicle sensors (e.g., the driving vehicle sensors and systems 304, etc.) and any one or more of the other vehicle systems. The sensor connectivity manager 466 can also facilitate communications between any one or more of the sensors and/or vehicle systems and any other destination, such as a service company, app, or in general to any destination where sensor data is needed.

The communications subsystem 350 can also optionally manage one or more identifiers, such as an IP address(es), associated with the vehicle and one or other system or subsystems or components and/or devices therein. These identifiers can be used in conjunction with any one or more of the connectivity managers as discussed herein.

Figure 5:
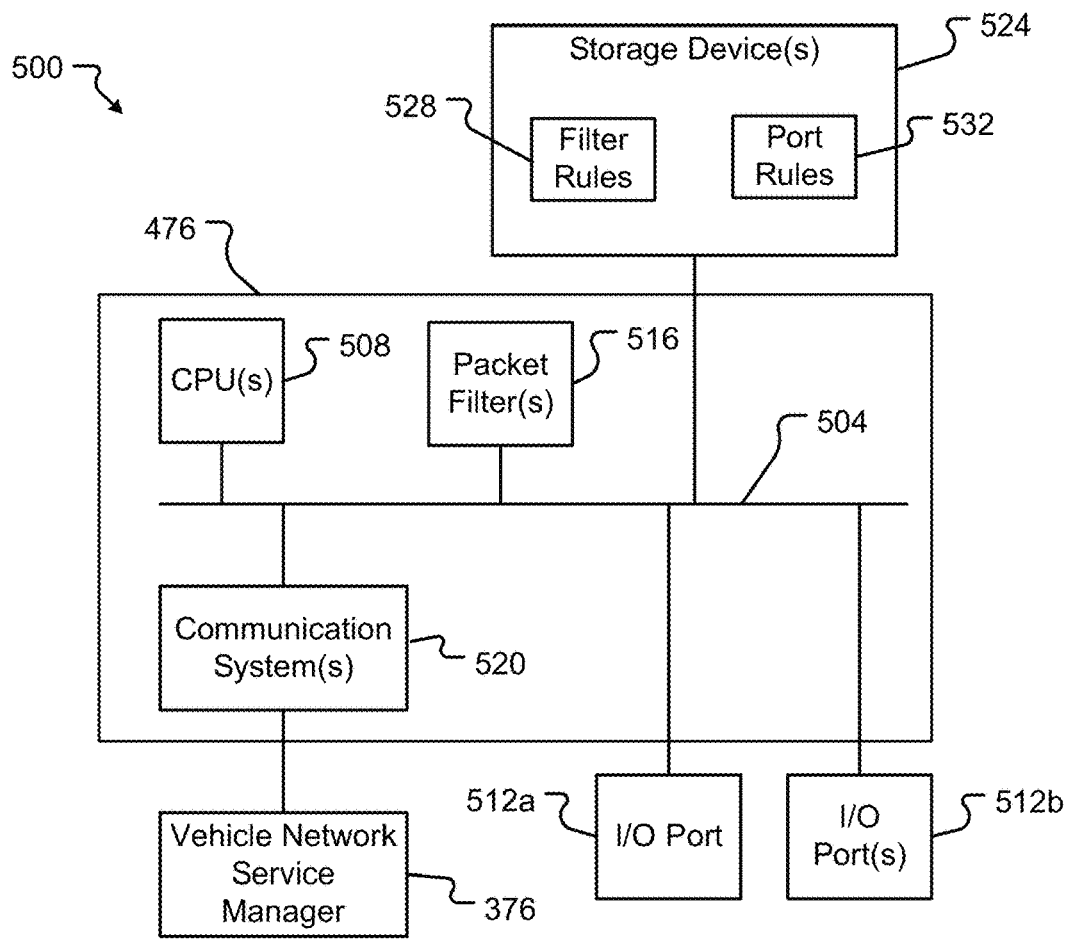
FIG. 5 is a block diagram of a system associated with the embodiments presented herein.

FIG. 5 illustrates another example communication subsystem 500 with which the systems and methods described herein may be deployed or executed. As shown in FIG. 5, the communication subsystem 500 includes intelligent processing engine 476, as shown in FIG. 4, one or more storage device(s) 524, VNSM 376, and one or more input/output ports 512*a*, 512*b*. The intelligent processing engine 476 includes hardware elements that may be electrically coupled via a bus 504. The hardware elements may include one or more central processing units (CPUs) 508, packet filters 516, and communication systems 520. The intelligent processing engine 476 may also include or be in communication with one or more storage devices 524 and one or more input/output ports 512*a*, 512*b*. By way of example, storage device(s) 524 used by the intelligent processing engine 476 may be disk drives, optical storage devices, solid-state storage devices such as a RAM and/or a ROM, which can be programmable, flash-updateable and/or the like and may store filter rules 528 and/or port rules 532.

The intelligent processing engine 476 may additionally include a communication system 520 (e.g., a modem, a network card (wireless or wired), an infra-red communication device, etc.) and may be in communication with a VNSM 376. As described herein, the VNSM 376 may be an application executed by a computer system such as computer system 700 that will be described with reference to FIG. 7.

The intelligent processing engine 476 may also include a packet filter 516 including one or more hardware and/or software elements which may perform packet filtering, such as described herein using a dynamic signature and/or other filtering rules. It should be appreciated that alternate embodiments of an intelligent processing engine 476 may have numerous variations from that described above. For example, customized hardware might also be used and/or particular elements might be implemented in hardware, software (including portable software, such as applets, NIC drivers, and/or downloadable BPF or XDP programs), or both. Further, connection to other computing devices such as network input/output devices may be employed.

Examples of the CPUs 508 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3470K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 6:
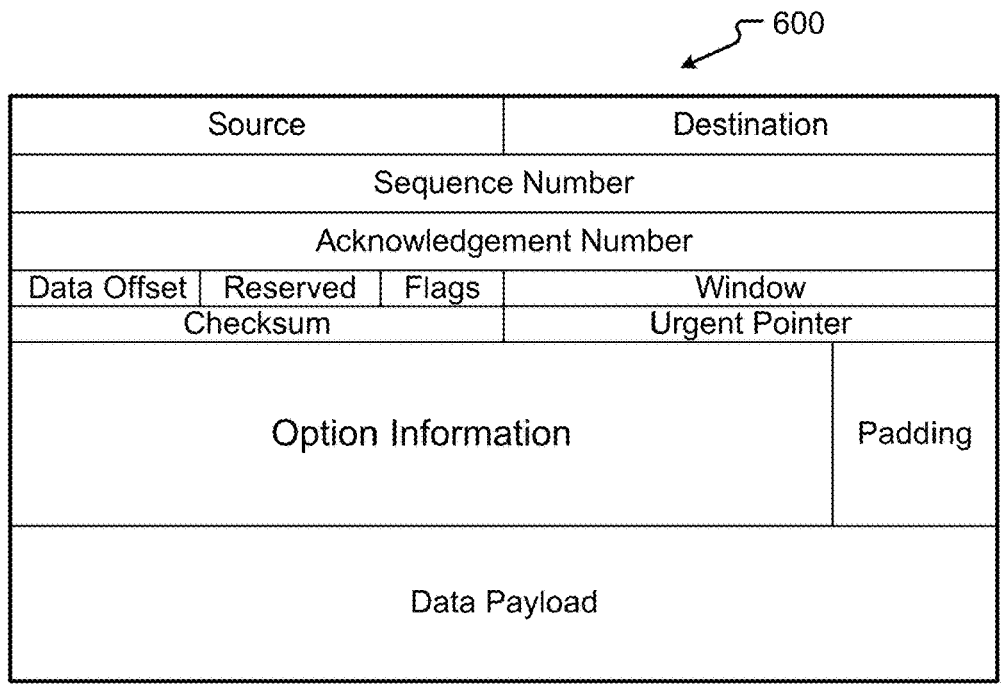
FIG. 6 is a block diagram of a packet associated with one or more embodiments described herein.

FIG. 6 illustrates components of a packet 600 in accordance with one or more of the implementations described herein. Such a packet 600 may be, for example, a TCP packet or a TCP segment. A packet 600 is a basic unit of data transmitted between nodes in a data connection such as a TCP connection. A packet 600 may consist of two main components: a header and a data payload. It should be appreciated that in some embodiments, a packet 600 may include greater or fewer elements than those illustrated in FIG. 6.

A header of a packet 600 may contain information required for the proper functioning of the protocol. For a TCP packet, the header may have a minimum size of 20 bytes and can be up to 60 bytes long, depending on the number and size of optional fields.

The header of the packet 600 may include fields including, but not limited to, an indication of a source port, an indication of a destination, a SEQ number, an ACK number, data offset information, reserved bits, one or more flags, a window size, a checksum value, an urgent pointer, option information, and optionally padding.

The option information field may be of a variable length and may contain optional information, such as a timestamp, maximum segment size, window scaling, or selective acknowledgments.

The data payload of the packet 600 is the actual data being transmitted between the sender and the receiver. The payload may follow the header and may vary in size, depending on the maximum segment size and the amount of data being transmitted.

A data stream may include a number of packets 600. The size of each packet 600 may be dependent upon a number of factors. For example, TCP includes a maximum segment size (MSS) option which affects the maximum size of each packet. Packet size may also be limited by the maximum transmit unit (MTU). MTU may be measured in bits or bytes. An MTU may be, for example, 1-2 kB. Using the MTU along with a maximum data transfer rate (measured, for example, in bits-per-second), a maximum number of packets per second may be calculated. Such a calculation may be as described in greater detail below.

In some embodiments, in the case of non-TCP protocols, such as User Datagram Protocol (UDP) being used by in-vehicle application services and clients, dynamic information such as an extra dynamic datagram SEQ and/or ACK number, or other dynamic signature information can be applied using a datagram trailer and/or a predefined payload location for authenticated services and service session. In this way, an intelligent packet filtering, classification, and QoS control system as described herein can be performed in traffic of protocols in addition to TCP.

In accordance with such embodiments, UDP data may be injected with customized secret information and/or protocol header information such as embedded packet SEQ numbers similar to those of TCP packets, hashed cookies, embedded timestamp information, and other information which may be recognized for rule generation and by a filtering program.

In some embodiments, in the case of UDP, both the vehicle service or other entity of the vehicle and the data source from which the data is being received may be aware of the added UDP header or trailer information.

When a packet 600 is received by a port 512 of a vehicle 100, the packet 600 may filter through the port 512 and be handled by an intelligent processing engine 476. For example, the packet 600 may be processed by a packet filter 516 of the intelligent processing engine 476 using one or more filter rules 528. If the packet 600 is not blocked at the packet filter 516, the packet 600 may be output by the communication system 520 of the intelligent processing engine 476 such as to an in-vehicle application service. In this way, the intelligent processing engine 476 may be used in relation to other components in a computer system 700, such as illustrated in FIG. 7 and described below, to provide the intelligent processing of packets based on expected runtime flow signatures and/or other information.

Figure 7:
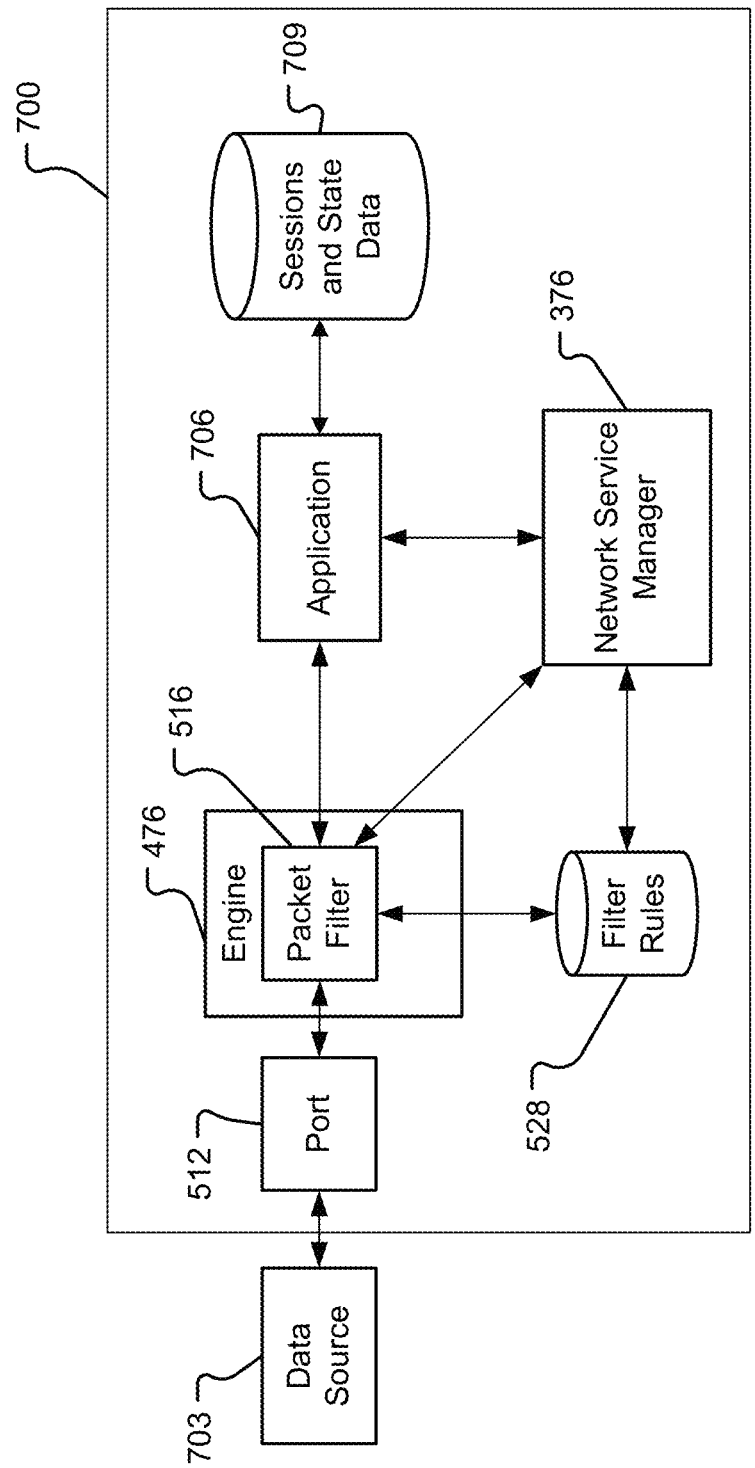
FIG. 7 is a block diagram of a system associated with one or more embodiments described herein.

The disclosed systems and methods may be performed by a computer system 700 as illustrated in FIG. 7 which communicates with at least one data source 703, according to some implementations. The computer system 700 may execute one or more applications 706, for example, in-vehicle application services, applications of a vehicle as described above such as ADAS or other vehicle control system 348 applications, navigation system 302, VNSMs 376, and other vehicle applications of, for example, a vehicle 100 as shown in FIG. 1, which rely on data from data sources 703 such as sensors and cloud-based data to execute processes to enhance driver safety, improve vehicle performance, provide user experiences, and other applications. Such applications 706 may be executed by a CPU 508 of the computer system 700 (not shown in FIG. 7 for simplicity) and/or a computing device 368 as illustrated in FIG. 3. Each application 706 may interact with data sources 703 such as various sensors within or on the vehicle, such as LiDAR sensor/system 320, radar sensors 324, camera sensors 332, etc., as well as from data sources 703 outside the vehicle such as navigation sources 356A via a communication network 352, to gather real-time data that enables the application to make informed decisions and take appropriate actions.

The computer system 700 may also include one or more intelligent processing engines 476 such as illustrated in FIG. 5. As described herein, an application 706, such as an ADAS or other vehicle application, may be enabled to receive data from a data source 703, such as a LiDAR sensor/system 320, radar sensors 324, camera sensors 332, etc., and/or data from sources such as navigation sources 356A via a communication network 352, in such a way as to reduce or eliminate the possibility of being successfully attacked with a DOS or DDOS attack. The disclosed systems and methods may be implemented or performed in by a computer system 700 in which a data source 703 communicates with an application 706 via a first system component, such as a port 512, and a second system component, such as an intelligent processing engine 476. A third system component, such as a VNSM 376, may be used to generate expected runtime flow signatures and/or perform other features as described below. The features illustrated in the computer system 700 of FIG. 7 may perform methods as described below in relation to FIGS. 8-13.

A first system component may include a port 512 which may be capable of receiving sessions, such as flows of packets, from one or more data sources 703. The first system component may be capable of assigning sessions received at the first system component with a particular QoS processing priority. For example, sessions received from a source which is not suspected as being a potential source of an attack may be assigned a higher QoS processing priority while sessions received from a source which is suspected as being a potential source of an attack may be assigned a lower QoS processing priority. The assignment of sessions with QoS processing priorities may be based at least in part on instructions received from another system component, such as a VNSM 376.

A second system component, such as an intelligent processing engine 476, as described in greater detail herein, may include a packet filter 516 capable of filtering traffic sent by one or more data sources 703 to one or more vehicle applications 706 based on one or more filter rules 528. In some embodiments, packet filters, filter rules, and/or packet filter programs, may be enforced by multiple intelligent processing engines 476 and/or NICs throughout a network in the vehicle. The second system component may be capable of comparing flow signatures of sessions received by the first system component with expected runtime flow signatures. The expected runtime flow signatures may be received by the second system component from a third system component such as a VNSM 376. Based on the comparison of the flow signatures of sessions received by the first system component with expected runtime flow signatures, the second system component may be enabled to change a QoS processing priority of sessions depending on whether the flow signatures of the sessions match expected runtime flow signatures. For example, the second system component may promote the QoS processing priority of sessions which include flow signatures matching or falling within a range of the expected runtime flow signatures and may demote the QoS processing priority of sessions which include flow signatures which do not match or fall within a range of the expected runtime flow signatures. In some implementations, the second system component may drop sessions which include flow signatures which do not match or fall within a range of the expected runtime flow signatures as potentially being traffic from bad actors as part of a DoS or DDOS attack.

The application 706, which may be a process or application executed by a computer system such as computer system 700 illustrated in FIG. 7, may be capable of reading from and writing to a memory storage device including sessions and/or state data 709. The application 706 may be capable of sending instructions to a third system component, such as a VNSM 376 as described herein. The third system component may be enabled to collect flow signatures of sessions from the application 706 and generate an expected runtime flow signature based on the collected flow signature. The third system component may send instructions to a first system component, such as a port 512, which may be used to assign sessions with a particular QoS processing priority. The third system component may also offload a generated expected runtime flow signature to a second system component.

The sessions and state data 709 stored in the memory storage device may include a set of data, such as a lookup table, storing information relating to all currently initiated communication sessions involving the application 706. For example, upon an application 706 completing a three-way handshake, such as by TCP, the application 706 may write an entry to the sessions and state data 709. The entry to the sessions and state data may include information by which each established communication session may be identified.

The VNSM 376 may be enabled to generate filter rules 528 based on information stored in the sessions and state data. As described below, the VNSM 376 may receive such data from the application 706 for which filtering is needed. The filter rules 528 generated by the VNSM 376 may be used by the packet filter 516 of the intelligent processing engine 476 to filter data received from the data source 703.

Filtering packets or network traffic as described herein may include determining if information in the traffic or packets matches a dynamic signature. The dynamic signature may include a set of static information and dynamic information. The static information may be information such as port numbers, addresses, etc., which do not generally change during the course of a communication. Dynamic information in a dynamic signature may be, for example, dynamic information which generally changes during the communication. For example, A dynamic signature as described herein may use a range of SEQ numbers, ACK numbers, or both to reduce or eliminate the probability of flood DDOS traffic passing through the filter.

While SEQ and ACK numbers are described herein as a part of a dynamic signature, it should be appreciated other factors may be used in addition or alternatively. For example, a hash signature may be embedded into TCP timestamp option of a packet sent to a data source. In response, a following packet received from the data source should be expected to include the hash signature in an echo timestamp option. In this way, the traffic can be filtered based on dynamic signature information embedded in the options and/or together with SEQ header fields, ACK header fields, and any other type of dynamic signature information. For UDP applications, an extra UDP payload header can be introduced. The extra UDP payload header may include dynamic, changing information which may be used for a dynamic signature.

In some embodiments, filtering traffic may include assigning or adjusting a QoS handling priority. For example, traffic which matches a dynamic signature used for filtering may be assigned a higher QoS handling priority or may be promoted to a higher QoS handling priority. Unmatched traffic may be assigned or demoted to a lower QoS priority. In some embodiments, traffic with a lower QoS priority may be dropped or otherwise treated as an exception. As a result, the delivery and processing of authenticated good traffic can be guaranteed even in the case of flood DDOS attack in severe overload situation.

Because applications in vehicles must communicate with sensors and data sources internal and external to the vehicle, such vehicle applications are exposed to one or both of internal subsystems and outside world application subsystems. For example, and as described above, an ADAS of a vehicle may interact internally with LiDAR, radar, and other sensors. The ADAS and other applications may use V2X road info from outside the vehicle. As a result, such vehicle applications can be exposed to various vulnerabilities, such as DDOS.

Attacks as described herein may originate from different networks, IP subnets, etc., which may be protectable using conventional firewalls. However, classic firewalls are insufficient and not capable of enabling applications to continue functioning in the face of attacks such as advanced DoS and DDOS threats, including, for example, DOS attacks from internal networks or attacks from the same host and network as legitimate traffic endpoints.

As described herein, OSI model layers enable communication between different devices over a network. Layer 1, or the physical layer, (L1) involves physical aspects of the network, such as cabling, connectors, and electrical signals. L1 is responsible for transmitting and receiving raw data (bits) over the physical medium. Layer 2, or the data link layer, (L2) is responsible for providing reliable data transfer between two directly connected devices. L2 establishes, maintains, and terminates the data link connection, provides error detection and correction, and manages data flow control.

Layer 3, or the network layer, (L3) is responsible for routing data packets between different devices across a network. L3 deals with the logical addressing (such as IP addresses) and makes decisions on the best path for data delivery. Layer 4, or the transport layer, (L4), is responsible for providing end-to-end communication between devices, ensuring reliable and ordered data transfer. L4 establishes, maintains, and terminates connections between devices, manages flow control, and provides error detection and recovery.

Layer 5, or the session layer (L5) is responsible for establishing, maintaining, and terminating sessions between devices. L5 coordinates communication between devices, manages data exchange, and synchronizes dialogues.

Layer 6, or the presentation layer, (L6) is responsible for data representation, translation, and encryption. L6 ensures that data is presented in a format that can be understood by both the sender and receiver, converting data from one format to another when necessary.

Layer 7, or the application layer (L7) is the topmost layer of the OSI model and deals with the actual application or application that the user interacts with. L7 is responsible for providing a user interface and facilitating communication between the user and the network.

A network of a vehicle enables ethernet network communications for LiDAR, radar, and other sensors to interact with applications such as ADAS at ethernet entrances. As a result, applications which rely on data from such data sources can be exposed to attacks and layer 3 IP and layer 4 port session information may be visible to attackers. Interactions between data sources and applications can be simulated by bad actors using the same layer 2, 3, and 4 state information to perform attacks such as DDOS flood attacks.

Conventional firewalls which block traffic based on such information are useless for attacks on applications such as DoS and DDOS attacks. For example, using a conventional firewall to limit the rate of traffic from an attacked network node can lead to the loss of all data from the attacked data source, such as LiDAR or radar, and make the application, such as ADAS, blind and/or useless, which leads to severe safety disasters.

Conventional firewall rules block application access from particular sources using a blacklist. Such a blacklist is ineffective when attacks originating from authentic data sources, which are not on the blacklist, bypass the blacklist firewall. Similarly, conventional firewall rules may use whitelists to allow only traffic from authentic data sources. Again, such a whitelist is ineffective when attacks originate from authentic data sources, which are on the whitelist and bypass the firewall.

Whitelists and blacklists rely on identifying data sources based on L3 and/or L4 packet information. For example, L3 information, which may be used to filter traffic, includes a source IP address or range of source IP addresses, destination IP address or range of destination IP addresses, and protocol type (e.g., IP, ICMP, or IGMP). L4 information which may be used to filter traffic includes source port number, destination port number, transport protocol (e.g., TCP, UDP, or SCTP, allowing finer control over the types of communication permitted within the network, TCP flags (e.g., SYN, ACK, or RST flags). As should be appreciated, such L3 and L4 information which may be used by traditional firewalls, if known by a bad actor, can be used by the bad actor to bypass firewall security. Once a session is established with an authentic data source, the L3 and L4 information used by the data source is fixed. As a result, attackers who can gain the access to the data source or obtain session packet fixed exchange information, can obtain the L3 and/or L4 information and use it to create a flood traffic attack and cause a DoS.

Traditional solutions also use rate limit for such traffic and attacks from whitelist alike source(s). As the rate limit rules in this case, cannot distinguish good from flood attacks, due to large volume of flooding traffic, which cause loss of the good client data, that leads to useless backend application.

The flood traffic and good traffic arrives at the application destination and are distinguished eventually by the application with application information, and bad traffic can be dropped, but this leads to the application become heavily overloaded and busy with processing flood and attack traffic and drops, which leads to useless application.

Similarly, vehicle applications which rely on V2X information are vulnerable to attacks using the same V2X sources used by the applications. This problem applies to all vehicle applications which use third party ECUs with potential exposure to attacks. Media access control security (MACSEC), if enforced, only protects link layer (L2) security, and cannot avoid a vehicle application being affected by such an attack. Neither transport layer security (TLS) nor application layer security can avoid flood traffic with state information matching layer 3 and/or layer 4 information of authentic data sources from reaching in-vehicle applications. Because MACSEC operates at L2, MACSEC does not protect both ends of a communication. TLS, which operates at the higher layers, layers 4-7, is similarly ineffective against attacks. As described herein, a method of filtering network traffic using a dynamic signature can prevent safety and security issues which plague traditional network security systems. Using a system or method as described herein, different layer flow signatures, such as L2, L3, and L4 dynamic and stateful information may be combined into an integrated changeable signature which may be learned from software systems at lower layers to mitigate the DDOS impact on vehicle applications. Using a system or method as described herein, attacks from bad actors with access to the visible, fixed L3, L4 flow signature information of authenticated data sources leading to flooding traffic attacks can be prevented from affecting vehicle applications through the use of a dynamic flow signature generated based on present data received in the established authenticated session and/or session and application communication pattern.

Figure 8:
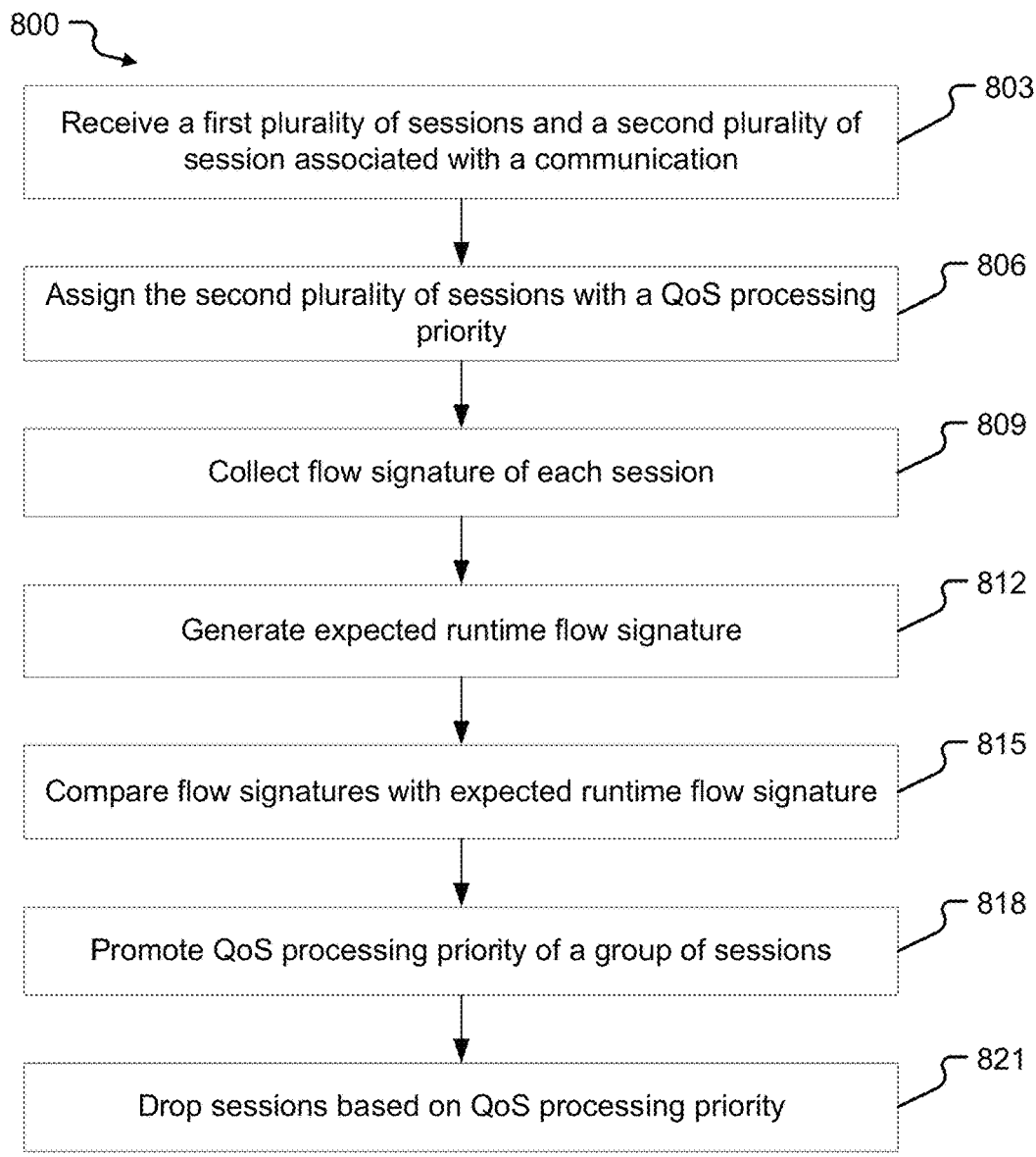
FIGS. 8-13 are flow charts of methods associated with one or more embodiments described herein.

FIG. 8 depicts a flowchart 800 for a method of protecting applications from DoS or DDOS attacks, according to some embodiments. As illustrated in FIG. 8, a method 800 may begin at 803 in which a system component receives a first plurality of sessions and a second plurality of sessions associated with a communication between a client and an in-vehicle application service.

Each of the first plurality of session and the second plurality of sessions may include one or more packets sent from a data source 703 towards an application 706, such as an application of a vehicle, as illustrated in FIG. 7. The data source 703, as described herein, may be onboard the vehicle or may be in communication with the vehicle such as via a network. For example, as illustrated in FIG. 1, the sessions may be received from sources outside the vehicle 100.

The sessions received may be packets 600 as illustrated in FIG. 5. For example, the data source 703 may segment data needed by the application 706 as part of a communication session into chunks that can be transmitted as individual packets such as via TCP. Each packet may include a header containing information such as source and destination addresses, packet SEQ number, and other control data, along with a payload carrying the data such as LiDAR data. The data source 703 may encapsulate the data packets into a format suitable for transmission over the vehicle's internal network, adding necessary headers for different network layers, such as Ethernet, IP, and/or TCP. The data source 703 may send the encapsulated packets onto the vehicle's network, where they are received by a first system component, such as an input/output port 512a.

The sessions may be received by a first system component of a vehicle. The first system component may be, for example, an input port or network input port. As illustrated in FIG. 5, sessions may be received by one or more input/output ports 512a-b.

For example, the sessions may be received by an input port 512. The input port 512 may be responsible for handling packets sent by a data source 703 and ensuring the packets reach their intended destination, i.e., the application 706, if the packets pass filtering. The data source 703 may be, for example, a network node associated with one or more of an on-board vehicle sensor, on-board diagnostic device, infotainment device, vehicle control system, and an in-vehicle service application, V2X network nodes and services outside of the vehicle and a cloud server.

As an example, a first client may communicate with a first application service, such as an application 706, using a first plurality of sessions, a second client may communicate with the first application service using a second plurality of sessions, a third client may communicate with a second application service using a third plurality of sessions, and a fourth client may communicate with the second application service using a fourth plurality of sessions. Each of the clients may communicate with a respective application service via one or more ports. For example, the first client may communicate with the first application service via a first port, the second client may communicate with the first application service via a second port, the third client may communicate with the second application service also via the second port, and the fourth client may communicate with the second application service via the first port.

Any session received by a vehicle may be a stateless or stateful attack. For example, a client may be hijacked or communication from a client may be hijacked by a bad actor. As a result, attack traffic may enter the vehicle with a similar pattern as to authentic traffic associated with the client. By hijacking a client or a client's communication, attackers can impact or disrupt normal functionality and security of the application service. Also, attacks may originate from sources other than clients and may arrive at a network input port. For example, a cloud network may be used to send packets at a port of a vehicle.

When an attack is not currently underway, an application service may receive sessions from one or more clients via one or more ports. Such sessions may be determined to be authenticated sessions not affiliated with a bad actor. When authenticated sessions are received, the session data may be assigned a first QoS processing priority by the first system component. The first system component may be enabled to assign session data with particular a QoS processing priority based on or in response to instructions from another system component such as a VNSM 376.

When an attack is underway, the attack may be detected in a number of ways and/or by a number of components of a vehicle. For example, an attack may cause port congestion, overload, and/or abnormal ingress traffic. In some implementations, such congestion, overload, and/or abnormal ingress traffic may be detected by the port at which the attack data is received.

As an example, an amount of data over time may be compared to one or more thresholds. If the traffic crosses a threshold, a port, or other component, may determine an attack is or is potentially underway. Other components which may detect congestion, overload, and/or abnormal ingress traffic may include network processing engines which report network congestion within a vehicle network, a NIC which may report NIC port traffic congestion, overload, or abnormal situations, and/or application services which may receive traffic which is unrelated to any authenticated session and/or does not match any authenticated session. Whenever a system component detects an attack or potential attack, the component may report the situation to a VNSM 376. For example, an input port may report congestion, overload, and/or abnormal ingress traffic crossing a threshold to a VNSM, one or more network processing engines may report network congestion within a vehicle network to a VNSM, a NIC may report NIC port traffic congestion, overload, and/or an abnormal situation to a VNSM, and/or an application service may report receipt of unrelated traffic not matching any authenticated session, an overload situation, dropped packets, and/or other abnormal situations to a VNSM.

When an application service reports an abnormal situation to a VNSM, the application service may share information such as an application service pattern including a receive rate and/or a transmission rate. It should be appreciated, however, that a VNSM may already have access to such information. For example, the VNSM may store application service patterns for any applications or vehicle services executing within the vehicle in a database.

The application service may also share information such as a list of current authenticated sessions and session states and/or signatures for each current authenticated session. For example, the application service may share static and/or dynamic signature information, L2, L3, L4 information relating to authenticated sessions, a SEQ and/or ACK number of a recently received packet from an authenticated session, window size information, timestamp information, cookie data, hash key data, hash signature data, and/or any other information which may be used by the VNSM to generate a flow signature.

The VNSM may be configured to determine when and/or whether protection may be necessary or desirable for a particular session. For example, upon receiving a report of congestion from a network input port, session data from an application service, or data otherwise indicating an attack may be underway, the VNSM may conclude a session associated with the attack may need protection. The VNSM may also determine one or more ports from which attack data is being received.

At 806, each of the received second plurality of sessions may be assigned a second QoS processing priority that is lower than the first QoS processing priority. The assignment of QoS processing priorities may be performed by a system component such as a network input port, a NIC, a switch, an intelligent processing engine, or another component. QoS processing priority assignments may be made based on port filter rules such as may be programmed by the VNSM into network input ports.

For example, the VNSM may program port filter rules which may instruct a port to mark frames or packets arriving at the port with a particular QoS processing priority. Depending on whether an input port has L3 or L4 parsing intelligence, the port may either mark or assign all packets arriving at the port with either a yellow flag or a lower QoS processing priority and/or may mark or assign packets which include a destination IP address matching an IP address of the application service affected by the potential attack or a destination port matching a port of the application service affected by the potential attack with a lower QoS processing priority.

Filtering packets as described herein may include parsing a received packet to identify a header of the packet. Information in the header of the packet may be used to determine whether to pass the packet to the designated destination or to treat the packet as an exception and drop the packet.

An intelligent processing engine 476 may use port rules 532 to filter packets received from various network nodes, ensuring that only packets from authorized sources reach the intended destination. Port rules 532 as described herein may include a set of predefined policies that govern the handling of data packets based on source and/or destination port numbers. Such port numbers may be part of the header information in received packets, identifying specific applications or services on a network node. By filtering packets based on port numbers, an intelligent processing engine 476 can control which types of data traffic are allowed to pass through or be dropped.

In some embodiments, port rules 532 may include one or more allow lists and/or deny lists. For example, an intelligent processing engine 476 may be configured to allow only specific port numbers to pass through while blocking all others (allow list) or to block specific port numbers while allowing all others (deny list).

The packet filter 516 may also execute packet filtering based on one or more filter rules 528. A packet filter rule 528 as described herein may be used by the packet filter 516 to filter a packet based on both static information and dynamic information. As described in greater detail herein, a dynamic signature may be created and a filter rule 528 may be created to filter packets based on the dynamic signature.

Static information used to filter packets may include information stored in packet headers which does not generally change between packets of a single TCP communication. For example, a TCP packet header may contain one or more static fields with information such as may be required for establishing and maintaining a communication between the application and the network node. Static fields in a TCP header may, for example, include a source port identifying a port number of the source device (sender) involved in the communication and a destination port identifying a port number of the destination device (receiver) involved in the communication. In some embodiments, static fields may also include one or more of a data offset, one or more control flags, a window size, a checksum, and/or one or more options.

In some embodiments, in response to a vehicle system detecting excessive data from a data source, an initial filtering of packets to the application from the data source may be initiated. For example, an application may request filtering of data from a particular data source. In response, data from the data source to the application may be identified, and a universal rule may be used to mark packets of the data with an indication that the packets may be associated with an attack. Such an indication may be, for example, a lower QoS value or other type of flag or indicator. In such an embodiment, traffic and/or packets associated with a potential attack may be marked as being of lower priority when first entering the vehicle system, resulting in such traffic consuming less system resources and bandwidth as compared to non-attacking traffics and/or applications.

Each packet received in a session may be handled by a packet filter 516 of the intelligent processing engine 476 as illustrated in FIG. 7. The packet filter 516 of the intelligent processing engine 476 may examine header information of each packet to determine a destination and may apply any filtering rules based on the packet's contents as described herein. The packet filter 516 may apply one or more filter rules 528 and/or port rules 532.

It should be appreciated that packet filtering may be selectively switched on and off. If the packet filtering is currently off, the packet may be delivered to its destination, e.g., an application, without filtering. The packet filter 516 may include one or more hardware filters and/or software filters. Each of the hardware and/or software filters may execute filtering based on one or more filtering rules stored in memory such as the filter rules 528 and the port rules 532 stored in the storage device(s) 524 illustrated in FIG. 7. Hardware-based packet filtering may in some embodiments may include using one or more devices equipped with specialized hardware, such as ASICs and/or field-programmable gate arrays (FPGAs), capable of performing packet filtering at high speeds with minimal latency. Software-based packet filtering may in some embodiments include using NIC device driver, eXpress Data Path (XDP), Berkely Packet Filter (BPF) programs, software applications, and/or scripts to filter packets.

Continue with reference to FIG. 8, at 809, a flow signature of each of the first plurality of sessions and each of the second plurality of sessions associated with the communication between the client and the in-vehicle application service may be collected.

The flow signature of each of the first plurality of sessions and the expected runtime flow signature include information on VLAN, source IP address, destination IP address, source port, destination port, SEQ number, ACK number, window size, selection of timestamp option, current timestamp, peer's used timestamp, hash key, cookies, selection of usage of cookie, hash signature inside timestamp option, or any combination thereof.

Collection of the flow signatures of each received session may be performed a system component such as an intelligent process engine, a VNSM, a NIC, or another component. In some implementations, the collected flow signatures of authenticated sessions may be used by the system component to generate an expected runtime flow signature between a client and an in-vehicle application service.

At 812, an expected runtime flow signature, or dynamic signature, may be generated based on the collected flow signature of each of the first plurality of sessions associated with the communication between the client and the in-vehicle application service.

The generation of expected runtime flow signatures may be performed for each session for which data is received at each port. For each session, a different dynamic rule may be generated which may be used by the port to detect or determine whether state information of traffic arriving at the port matches or does not match the expected runtime flow signature.

The generated expected runtime flow signature may include a SEQ number range, an ACK number range, or a combination thereof of a session that is expected to be received based on a time at which past sessions were received. For example, a generated expected runtime flow signature may include a SEQ number and/or a SEQ number window or range, and/or an ACK number and/or ACK number window or range. The SEQ and/or ACK number and/or range in the generated expected runtime flow signature may be compared to header information in received frames and may be generated based on header information of recently received frames.

In some implementations, the VNSM 376 may create a rule and/or a dynamic signature which may be used by a filter 516 of an intelligent processing engine 476. The VNSM 376 may store the rule as a filter rule 528 in a storage device 524 of the intelligent processing engine 476 or accessible by the intelligent processing engine 476.

As described above, an application 706 may be enabled to generate a request for filtering in response to a detection of an excessive rate of data received from a network node such as a data source 703. The request may include information, such as session and state data 709 which may be stored in memory accessible to the application. Such information may include, for example, information such as may be stored in a packet header of a packet 600 as illustrated in FIG. 6 from an authenticated session with the data source 703 for which filtering is requested. Information in a request for filtering may include a source port, a destination port, a SEQ number of a recently received packet, an ACK number of a recently received packet, a timestamp and/or an echo timestamp of a recently received packet, and/or information relating to one or more options stored in a header of a recently received packet from an authenticated session with the data source 703. Session and state data 709 may be associated with an authenticated session with a data source 703 or another network node. The session and state data 709 may be used by the VNSM 376 to identify a pattern of recently received data from an authenticated session. As described herein, such recently received data may be used to generate filter rules and use such filter rules to create or update filter programs to filter new data received from the same source as the authenticated session.

The request for filtering may also include information such as a maximum expected data rate from the data source 703. The maximum expected data rate may be a maximum number of packets-per-second, or a maximum number of bits-per-second, as examples.

By way of the request for filtering, the application 706 may inform the VNSM 376 of an authorized communication session, such as a TCP communication session, as well as of a recent packet received as part of that communication session.

In some embodiments, the VNSM 376 may be capable of interacting with each application under a potential attack to obtain a current list of authenticated sessions. The VNSM 376 may also be capable of obtaining authenticated and current ingress flow signatures such as using L3 and/or L4 static information, as well as a current expected ingress SEQ number and/or ACK number for TCP sessions. The current authenticated session list may be a core priority-based session list based on protection need.

The VNSM 376, using the information in the request and/or other information accessible by the VNSM 376, may determine an expected range of dynamic information for packets which may be expected to be received by the application as part of the authorized communication session. The expected range of dynamic information may be determined based on packet header information of a recently received packet, present session state data stored in memory, a threshold data rate, and/or other information relating to a session with the application and/or recently received packets from an authenticated session.

For example, if a recently received packet has a SEQ number of 105, and the maximum number of packets-per-second is 100, the VNSM 376 may determine a range of expected SEQ numbers over the next five seconds is between 106 and 605. In some embodiments, instead of using a most-recently received packet SEQ or ACK number, the VNSM 376 may use a SEQ or ACK number which the application under attack expects to next receive.

In some embodiments, the maximum data rate may be measured in bits or bytes per second. In such embodiments, the range of expected SEQ numbers, or other dynamic information, may be determined by calculating an expected packet size.

The VNSM 376 may generate a range of expected dynamic information for packets by using current expected SEQ and/or ACK numbers the application is expecting, as well as actual pattern information of the application, such as an ingress traffic rate, such as a number of bits per second. Using the dynamic information, a rule may be created to contain all of the static and dynamic signature information. The rule may be used to program hardware and/or software to filter out or lower a QoS priority of traffic which does not match the authenticated session flow information. The dynamic information, such as SEQ and/or ACK number ranges may be used to create range masks which may be used to filter packets which contain SEQ and/or ACK numbers outside the ranges.

Determining an expected range of SEQ numbers may include determining an expected or maximum ingress rate of data from the data source for the application under attack. Determining an expected range of ACK numbers may include determining an expected or maximum egress rate of data from the application.

Because the actual size of each packet may vary depending on payload and options, the packet size in bits or bytes may be estimated. In some embodiments, the range of packets over a particular timeframe may be estimated based on a minimum packet size. For example, a TCP packet without a payload may be 160 bits. As a result, the VNSM may calculate an expected number of packets by first multiplying dividing the product of the number of seconds and the maximum expected number of bits per second by the minimum expected packet size.

It should be appreciated that in some embodiments other calculations may be used. For example, the estimate may use an average packet size based on past received packets associated with a particular data source 703 or associated with other data sources. As another example, the estimate may use a maximum packet size based on information such as an MTU.

The expected number of packets to be received over a particular time period may be added to the recent packet information. For example, if the application 706 indicates a recent packet has an SEQ number of 105, an ACK number of 206, a timestamp of 307, and an echo timestamp of 408, and if the VNSM 376 determines the expected number of packets for the time period in which the filter rule will be established is 100 for receiving, 50 for transmitting, and the ranges may be determined as 106-205 for SEQ numbers, 207-256 for ACK numbers, 308-407 for timestamps, and 409-448 for echo timestamp etc.

In this way, the calculations of the expected range may be repeated for each of the dynamic variables to be used for filtering. For example, an expected range of SEQ numbers, ACK numbers, a timestamp, and/or other information may be calculated.

In some embodiments, dynamic information may include numbers which do not increase by one with each packet. For example, a timestamp may indicate a time, such as in seconds, and may increase only after a certain number of packets are received. As another example, a code or a pseudorandom number may be inserted in packets. The code or pseudorandom number may change between packets in expected ways which may or may not be consecutive. The VNSM 376 may be programmed to calculate an expected range for any such information.

Using the determined expected range of dynamic information, the VNSM 376 may create a dynamic signature. A dynamic signature may include information which may be expected to match authentic packets received as part of the communication session. The dynamic signature may include both static information as well as ranges of dynamic information. The dynamic signature may include or be associated with a time frame or time limit in which the dynamic signature may be used for filtering. The dynamic signature may include or be associated with a hash of selected information and/or cryptographic fingerprints in addition to or instead of information in a header of a packet.

As should be appreciated, a dynamic signature may be generated by selecting a range of expected timestamps, a range of expected timestamp echo, a hash key, a cryptograph fingerprint, and/or other information instead of a range of ACK or SEQ numbers. Filtering rules may be created based on such dynamic signatures and filtering programs may, in response, filter traffic by blocking packets which do not match the dynamic signature information, such as packets which do not match a timestamp, timestamp echo, hash key, or fingerprint.

In some embodiments, creating a dynamic signature may include creating a dynamic signature rule or program. A dynamic signature rule may be a filtering rule capable of being used by a network filter to filter packets or traffic based on the dynamic signature. A dynamic signature program may be a software application capable of filtering packets or traffic based on the dynamic signature. Dynamic signatures, rules, and/or programs may be stored in memory in such a way as to enable packet filtering and/or QoS control of ingress data associated with a data source used by an application.

The dynamic signature may include information which may be used by a packet filter 516 of an intelligent processing engine 476 to filter packets based on both static and dynamic information. As described above, the packet filter 516 may include one or more hardware and/or software filters. In some embodiments, the packet filter 516 may be programmed using filter rules 528 by a CPU 508 of the intelligent processing engine 476.

The VNSM 376, after creating the dynamic signature, may store the dynamic signature or a filtering rule to the filter rules 528 in the storage device 524 of the intelligent processing engine. The intelligent processing engine 476 may use the dynamic signature to filter packets for the time range or until the time limit associated with the dynamic signature. For example, the dynamic signature may be used to create or generate a filter rule and a filter rule may be used to program a filtering program which may be used to filter traffic which fails to match the dynamic signature information.

At 815, the flow signature of each of the second plurality of sessions may be compared with the expected runtime flow signature based on a time at which each of the second plurality of sessions were received.

Comparing the flow signature of each of the second plurality of sessions with the expected runtime flow signature may be performed by a system component such as a network input port. Comparing the flow signature of each of the second plurality of sessions with the expected runtime flow signature may be performed using filter rules 528 which may be implemented in hardware or software.

As described herein, a filter created by the VNSM may be capable of filtering incoming data based on both static and dynamic information. The dynamic information used for filtering may be associated with a time range or time limit. For example, a particular filter rule capable of being used to filter packets based on dynamic information may be valid for a limited time, such as five seconds.

The packet filter 516 of the intelligent processing engine 476 may initiate filtering. The intelligent processing engine 476 may filter packets received from a data source 703 using packet filter rules 528 by applying the rules 528 using a packet filter 516. The packet filter 516 may include one or more hardware filters, one or more software filters, or a combination of both. The filtering process may in some embodiments involve inspecting incoming packets from a data source 703 based on header information, payload, and/or other criteria and deciding whether to forward, drop, or modify the packets according to the rules 528.

In some embodiments, packets which pass the filter and are forwarded to the destination may be labeled with a higher QoS or a QoS rating may be increased.

Hardware-based packet filtering may be performed by specialized hardware components, such as ASICs, FPGAs, or Network Processing Units (NPUs), which may be integrated into the intelligent processing engine 476. Such hardware components may be designed to process packets at high speeds with minimal latency.

Software-based packet filtering may be performed by an operating system, NIC driver program, or a separate software application running on a CPU or a host device. Software filters offer more flexibility and can be easily updated or modified but may introduce higher latency compared to hardware filters due to the additional processing overhead.

In some embodiments, a combination of hardware and software filters may be used to provide a balance between high-speed packet processing, flexibility, and advanced filtering capabilities.

The process for filtering may involve inspecting ingress packets, performing rule matching, and implementing decision making and actions. As packets arrive at the intelligent processing engine 476, the filter 516 may examine static packet header fields, such as source and destination IP addresses, port numbers, protocol type, and other relevant information, as well as dynamic packet header fields, such as SEQ numbers, ACK numbers, timestamps, and other relevant information. The filter 516 may compare the extracted packet information against the stored rules 528, determining if the packet matches any of the predefined filter criteria. Based on the matching rules, the filter 516 may perform the appropriate action, such as forwarding the packet to the correct output port, dropping the packet, or modifying certain packet fields before forwarding. In some embodiments, filtering may include first filtering packets based on port rules 532 to filter out traffic from non-authenticated sources. Next, the filter rules 528 including dynamic signatures may be used to filter packets which originate from authenticated sources.

At 818, the QoS processing priority of one or more packets of session traffic may be promoted to a higher QoS processing priority.

For example, based on the comparison of the flow signature of each of the second plurality of sessions with the expected runtime flow signature may result in matching packets being promoted to a higher QoS processing priority, such as increasing a QoS processing priority or changing a flag from yellow to green.

For example, when an application 706 is under attack and excessive amount of traffic is being received at a first port, the first port may, based on instructions from a VNSM 376, mark all received traffic with a lower QoS processing priority and a packet filter 516 or other system component may determine whether each received packet matches a dynamic signature and promote any matching dynamic signature.

At 821, packets which do not match the dynamic signature, and which continue to have a lower QoS processing priority after passing through the filter 516, a NIC, or another component which compares the flow signature of each of the second plurality of sessions with the expected runtime flow signature may be dropped or may in some implementations be stored in quarantine.

In some embodiments, the intelligent processing engine 476 may monitor the number of packets filtered out and the number of packets allowed through the filter 516 to determine whether filtering is effective and/or necessary. To determine the data rate (e.g., bits-per-second or packets-per-second) of the filtered data, the intelligent processing engine 476 may keep track of the packet sizes and the time interval during which the packets are processed.

In some embodiments, the intelligent processing engine 476 may maintain counters for the number of packets filtered out and the number of packets allowed through the filter. Such counters may be implemented in hardware, software, or both. In addition to counting packets, the intelligent processing engine 476 may alternatively or additionally maintain byte counters for both the filtered out and allowed through packets. As each packet is processed, the intelligent processing engine 476 may increment the corresponding byte counter by the packet's size, such as may be measured in bits.

The intelligent processing engine 476 may evaluate the data rate at regular intervals, e.g., every second or every few milliseconds. When the evaluation is performed, the intelligent processing engine 476 may calculate a data rate for both the filtered out and allowed through packets such as by dividing the total number of bytes processed during the evaluation interval by the duration of the interval.

By monitoring the data rates for filtered out and allowed through packets, the intelligent processing engine can determine if an attack is continuing or has ended. For example, if the data rate of filtered out packets exceeds a threshold number, it might indicate the attack which triggered the filtering rule may be ongoing. A threshold number may be used, as described herein, to detect malicious data originating from a bad actor, as malicious data created by a bad actor is unlikely to include accurate header information such as SEQ numbers, ACK numbers, codewords or hashes injected into packets sent to the source of the attack by an application, or other dynamic information as described herein. As such, a number in a header of a packet above a maximum threshold or below a minimum threshold may be identified as potentially malicious.

After a time, limit, if the data rate from the data source 703 is still excessive, and there is excessive traffic being filtered, the packet filter 516 may request the VNSM 376 renew the dynamic signature. If, after the time limit, the data rate from the data source 703 is no longer excessive, and there is no excess traffic being filtered, the packet filter 516 may cease filtering the traffic based on the filter rule 528 and the method may cease or repeat.

As described above, each dynamic signature may include or be associated with a time limit. Such a time limit may be, for example, five seconds. As a dynamic signature expires or nears expiration, a determination may be made as to whether traffic from the data source 703 to the application 706 remains at an excessive level. If so, the filtering may be needed to continue to resume past the expiration of the dynamic signature. As a result, the dynamic signature may be renewed, updated, or recreated, for a new time range or until a new time limit.

At or near the end of the duration of a dynamic signature being used for filtering, the intelligent processing engine 476 may determine packet filtering is still required. Such a determination may be made based on a determination that packets being sent from a data source 703 to an application 706 exceed a threshold number of packets or a threshold data rate. For example, after or during the filtering of received data, an application or other entity capable of detecting received data may continuously or periodically monitor traffic to detect whether a traffic flow received in a session for which filtering is or was being performed is below or above a maximum data threshold. In response to detecting that the traffic flow is below the maximum data rate, the filtering of the session data may cease. On the other hand, in response to detecting that the traffic flow is above a maximum data rate, the filtering of the session data may continue with updated filtering rules with dynamical signature based on renewed and updated session state information.

It should be appreciated that in some embodiments, any intelligent processing engines, NICs, NIC drivers, applications, and/or other systems and processes which handle or are capable of monitoring or tracking flows of data may be capable of reporting information relating to the performance of filtering to the VNSM or to the application for which the filtering is being performed. In response, the VNSM or the application may be capable of determining whether protection needs to be renewed or can be stopped, If the filtering needs to be renewed and continue, the VNSM may renew and update any dynamic signatures, rules, and/or programs. If it is determined that the filtering may be stopped, the filtering rules and/or programs can be removed from the packet filter.

In response to a dynamic signature time limit expiring and based on a determination that an excessive number of packets are being treated as exceptions based on the dynamic signature, the intelligent processing engine 476 may generate a request for a renewed dynamic signature.

It should be appreciated that these dynamic signature time ranges may overlap. There is no need for one to be expired to create a new one. For example, a first dynamic signature may be valid from 0-5 seconds. At 3 seconds, a second dynamic signature may be created with a valid time range from 3-8 seconds. At 4 seconds, the filtering may switch from the first signature to the second signature. At 7 seconds, the filtering may switch from the second signature to a third signature, and so on.

A VNSM 376 may receive the request for renewed dynamic signature. In some embodiments, the request for a renewed dynamic signature may be created by the intelligent processing engine 476 or by the application 706. The requesting entity may generate the request in response to a determination that an attack is ongoing.

Determining an attack is ongoing may include the requesting entity, either the intelligent processing engine 476 or the application 706, may monitor the filtering as described above. Next, the requesting entity may determine a rate of traffic from a data source 703 to an application 706 being filtered by a network filter 516 and compare the determined rate of traffic to a maximum expected rate for communications between the data source 703 and the application 706. If the determined rate of traffic exceeds the maximum expected rate for communications between the data source 703 and the application 706, the requesting entity may determine the attack is ongoing and may generate a request for a renewed dynamic signature.

As should be appreciated, the process of requesting a renewed dynamic signature may be performed prior to expiration of the timeframe or the time limit for the existing dynamic signature. As a result, the filter 516 can seamlessly switch to a next dynamic signature without a break in filtering.

In response to receiving the request for the renewed dynamic signature, the VNSM 376 may request packet info from the application 706 associated with the communication being filtered. As described above, the VNSM 376 may receive packet info (e.g., latest SEQ number), create dynamic signature and/or a filtering rule based on dynamic signature, and store the dynamic signature or filtering rule to memory accessible by the intelligent processing engine.

Figure 9:
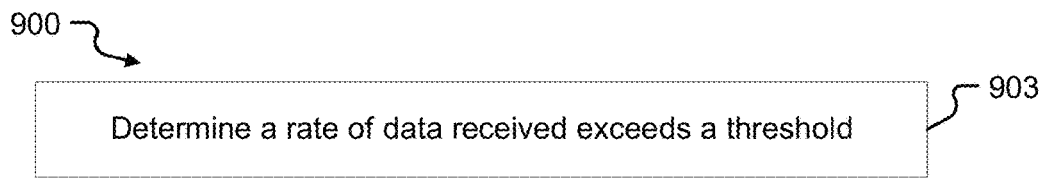

As illustrated in FIG. 9, a method 900 may be implemented in accordance with one or more of the embodiments described herein. At 903, a determination may be made that a rate of data received exceeds a threshold. As described above, when an attack is underway, the attack may be detected in a number of ways and/or by any one or more of a number of system components. For example, an attack may cause port congestion, overload, and/or abnormal ingress traffic. In some implementations, such congestion, overload, and/or abnormal ingress traffic may be detected by the port at which the attack data is received, by a component of a NIC, by an application such as an application 706, a packet filter 516, and/or other components. Detecting congestion, overload, and/or abnormal ingress traffic may involve comparing a rate of data received to one or more thresholds. If the rate of data received crosses a threshold, a determination may be made that an attack is underway.

Figure 10:
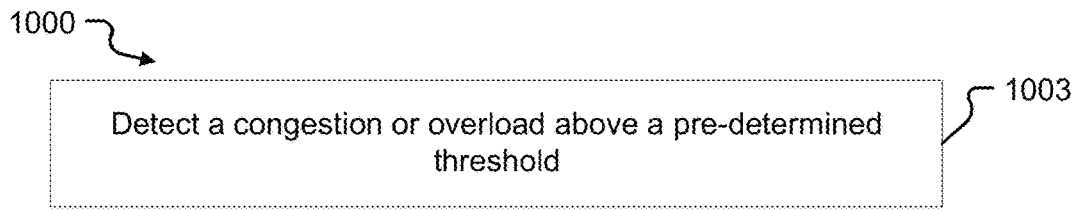

FIG. 10, a method 1000 may be implemented in accordance with one or more of the embodiments described herein. At 1003 a detection may be made that a congestion or overload is above a pre-determined threshold. As described above, an attack may cause port congestion, overload, and/or abnormal ingress traffic. When an attack is underway, the attack may be detected in a number of ways and/or by any one or more of a number of system components. For example, congestion, overload, and/or abnormal ingress traffic may be detected by the port at which the attack data is received, by a component of a NIC, by an application such as an application 706, a packet filter 516, and/or other components. Detecting congestion, overload, and/or abnormal ingress traffic may involve comparing a rate of data received to one or more thresholds. If the rate of data received crosses a threshold, a determination may be made that a current amount of congestion or overload is above a pre-determined threshold.

Figure 11:
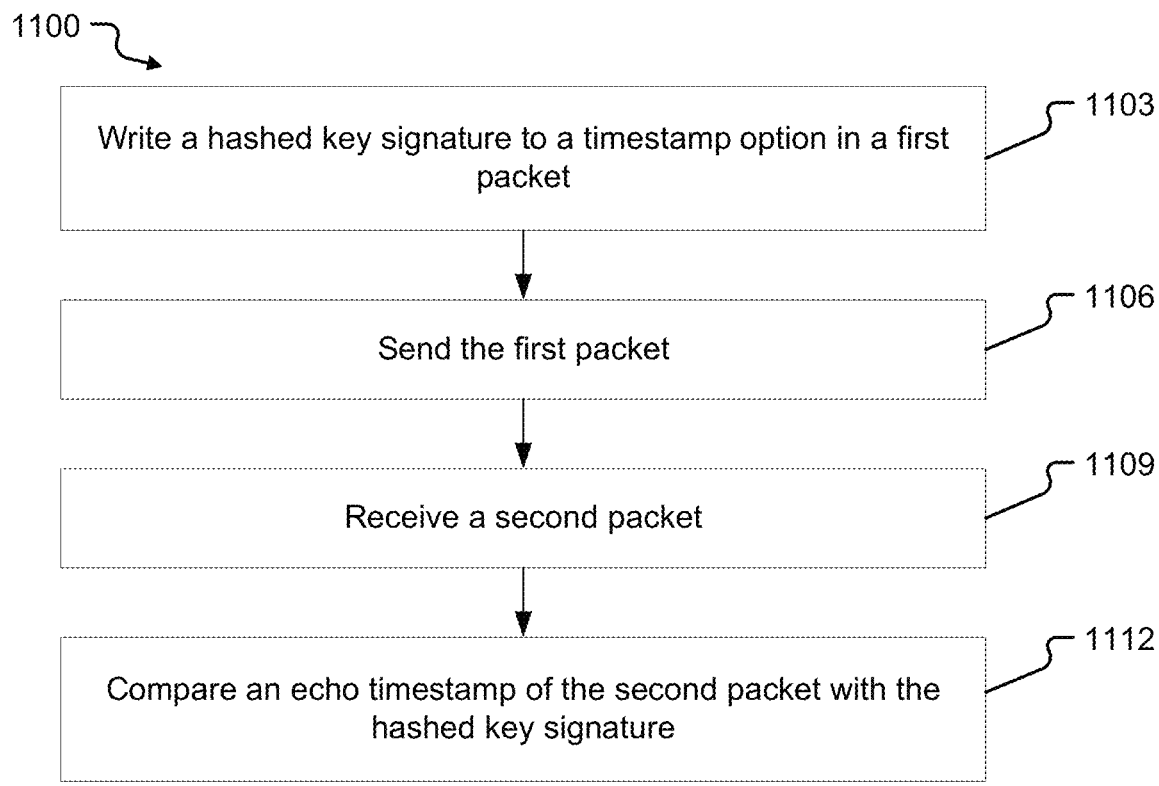

To facilitate efficient and reliable transmission of data to and from applications, a communication subsystem such as illustrated in FIGS. 3 and 5 may be used. In some embodiments, a communication protocol such as TCP may be used. As illustrated in FIG. 11, a method 1100 of enabling communication between an application and a network node may be implemented in accordance with one or more of the systems and methods described herein. The method 1100 may enable applications to be secured from DoS, DDOS, and/or other attacks by providing dynamic signatures, based on dynamic and stateful information, which may be used to perform cascade hardware and/or software packet filtering as well as for providing prioritization, enabling high performance of applications as described herein even in the face of a targeted attack.

As described above, while SEQ and ACK numbers are described herein as a part of a dynamic signature, it should be appreciated other factors may be used in addition or alternatively. For example, a hash signature may be embedded into TCP timestamp option of a packet sent to a data source. In response, a following packet received from the data source should be expected to include the hash signature in an echo timestamp option. In this way, the traffic can be filtered based on dynamic signature information embedded in the options and/or together with SEQ header fields, ACK header fields, and any other type of dynamic signature information. For UDP applications, an extra UDP payload header can be introduced. The extra UDP payload header may include dynamic, changing information which may be used for a dynamic signature.

The method 1100 may involve generating a hashed key signature. In some implementations, generating the hashed key signature may include generating a string based on an input. The string may be a sequence of numbers and letters. The hashed key signature may be generated in such a way as the same input will always produce the same output. In some implementations, generating the hashed key signature may include the employment of a hashing algorithm, such as SHA-256, MD5, SHA-3, or others. In some implementations, a secret key may be combined or concatenated with the input prior to or after employing the hashing algorithm.

At 1103 a hashed key signature may be written to a timestamp option in a packet to be sent toward a potential attack source or comprised data source. Such a packet may be, for example, a packet 600 as illustrated in FIG. 6. The packet 600 may include option information including a timestamp option. The writing of the hashed key signature to the packet may be performed by one or more of a VNSM 376, an intelligent processing engine, a packet filter 516, an output port, an application, or another system component. It should be appreciated the timestamp option field is described herein for illustration purposes only and that in some implementations the hashed key signature may be written to other option fields and/or other header fields of a packet or may be appended to a packet or otherwise included with a packet. However, by including the hashed key signature in the timestamp option of the packet, a second may be expected to be received in response including the hashed key signature in an echo timestamp option as described below. If a packet is received in response which does not include the hashed key signature in the echo timestamp, a determination may be made that the source of the packet is compromised or an attack.

At 1106, the first packet may be sent via a port toward the potential attack source or comprised data source. In some implementations, the port may be directed towards a data source which may have been detected as being potentially compromised or exhibiting signs of potential security concerns, such as excessive data rates. The data source, in certain circumstances, may be associated with one or more networks or may be standalone. The first packet may carry a variety of information, which could include, but is not necessarily limited to, data queries, authentication requests, or security probes, as well as the hashed key signature in the timestamp window.

The potentially compromised data source, upon receiving the first packet, may respond with an acknowledgment, an error message, or any other type of packet. At 1109, a second packet may be received from the potential attack source or comprised data source via the port. At 1112, after receiving the second packet, an echo timestamp of the second packet may be compared with the hashed key signature. Comparing the echo timestamp of the second packet to the hashed key signature may involve parsing the second packet to detect the echo timestamp and accessing the hashed key signature in memory. If the echo timestamp does not match the hashed key signature, a determination may be made that the source of the packet is compromised or an attack.

Figure 12:
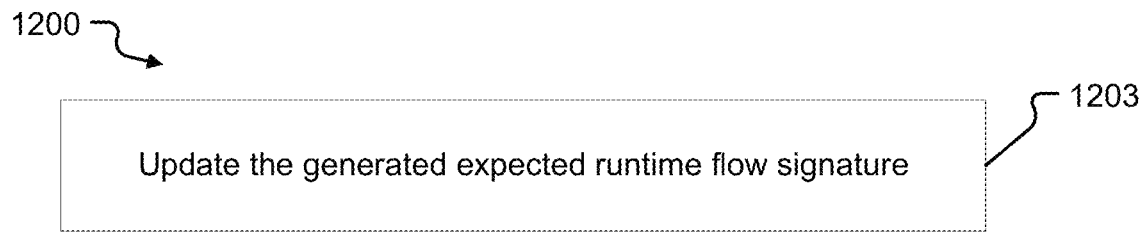

FIG. 12, a method 1200 may be implemented in accordance with one or more of the embodiments described herein. At 1203 the generated expected runtime flow signature may be updated. As described above, as a dynamic signature expires or nears expiration, a determination may be made as to whether traffic from the data source 703 to the application 706 remains at an excessive level. If so, the filtering may be needed to continue to resume past the expiration of the dynamic signature. As a result, the dynamic signature may be renewed, updated, or recreated.

In response to a dynamic signature time limit expiring and/or based on a determination that an excessive number of packets are being treated as exceptions based on the dynamic signature, the intelligent processing engine 476 may in some implementations generate a request for a renewed dynamic signature. A VNSM 376 may receive the request for renewed dynamic signature. In some embodiments, the request for a renewed dynamic signature may be created by the intelligent processing engine 476, by the application 706, or by another requesting entity. The requesting entity may generate the request in response to a determination that an attack is ongoing.

In response to receiving the request for the renewed dynamic signature, the VNSM 376 may request packet info from the application 706 associated with the communication being filtered. As described above, the VNSM 376 may receive packet info (e.g., latest SEQ number), create dynamic signature and/or a filtering rule based on dynamic signature, and store the dynamic signature or filtering rule to memory accessible by the intelligent processing engine such as in accordance with the method 800 of FIG. 8 as described above.

Figure 13:
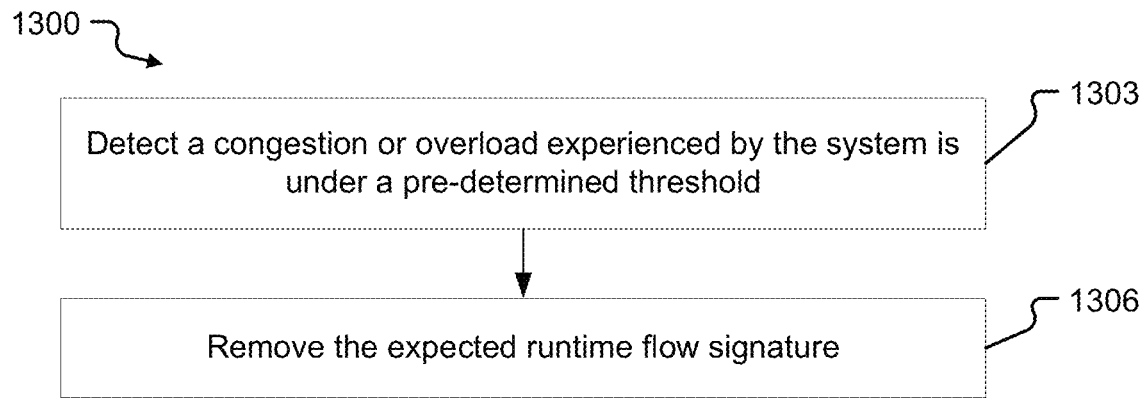

FIG. 13, a method 1300 may be implemented in accordance with one or more of the embodiments described herein. At 1303 a detection may be made that a congestion or overload experienced by the system is under a predetermined threshold. As described above, an attack may cause port congestion, overload, and/or abnormal ingress traffic. When an attack is underway, the attack may be detected in a number of ways and/or by any one or more of a number of system components. For example, congestion, overload, and/or abnormal ingress traffic may be detected by the port at which the attack data is received, by a component of a NIC, by an application such as an application 706, a packet filter 516, and/or other components. Detecting congestion, overload, and/or abnormal ingress traffic may involve comparing a rate of data received to one or more thresholds. If the rate of data received crosses a threshold, a detection may be made that a current amount of congestion or overload is above a pre-determined threshold. If, on the other hand, the rate of data received is below the threshold, at 1306 the expected runtime flow signature and/or other filtering may be removed and may cease.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a system in a vehicle, the system comprising: one or more processors; and a memory storing instructions that, when executed by the one or more processors, cause the system to: receive a first plurality of sessions and a second plurality of sessions associated with a communication between a client and an in-vehicle application service, wherein the first plurality of sessions are authenticated sessions with a first quality of service (QoS) processing priority; assign each of the received second plurality of sessions with a second QoS processing priority that is lower than the first QoS processing priority; collect a flow signature of each of the first plurality of sessions and each of the second plurality of sessions associated with the communication between the client and the in-vehicle application service; generate an expected runtime flow signature based on the collected flow signature of each of the first plurality of sessions associated with the communication between the client and the in-vehicle application service; compare the flow signature of each of the second plurality of sessions with the expected runtime flow signature based on a time at which each of the second plurality of sessions were received; promote the second QoS processing priority of a group of the second plurality of sessions to the first QoS processing priority; and drop the second plurality of sessions with the second QoS processing priority.

Aspects of the above system include wherein the flow signature of each of the first plurality of sessions includes information on virtual local area network, source Internet Protocol (IP) address, destination IP address, source port, destination port, sequence number, acknowledgement number, window size, selection of timestamp option, current timestamp, peer's used timestamp, hash key, cookies, selection of usage of cookie, hash signature inside timestamp option, or any combination thereof.

Aspects of the above system include wherein the generated expected runtime flow signature includes a sequence number range, an acknowledgement number range, or a combination thereof of an expected session that is expected to be received based on the time at which each of the second plurality of sessions were received.

Aspects of the above system include wherein the instructions further cause the system to detect that the system is under a congestion or overload that is above a pre-determined threshold.

Aspects of the above system include wherein the instructions further cause the system to update the generated expected runtime flow signature.

Aspects of the above system include wherein the instructions further cause the system to: write a hashed key signature to a timestamp option in a first packet; send the first packet; receive a second packet; and compare an echo timestamp of the second packet with the hashed key signature.

Aspects of the above system include wherein the system further comprises a first system component and a second system component, wherein the first system component is configured to receive the first plurality of sessions and the second plurality of sessions and assign each of the second plurality of sessions received at the first system component with the second QoS processing priority, and wherein the second system component is configured to compare the flow signature of each of the second plurality of sessions with the expected runtime flow signature, promote the second QoS processing priority of the group of the second plurality of sessions to the first QoS processing priority, and drop the second plurality of sessions with the second QoS processing priority.

Aspects of the above system include wherein the system further comprises a third system component and the third system component is configured to: collect the flow signature of each of the first plurality of sessions and each of the second plurality of sessions; and generate the expected runtime flow signature based on the collected flow signature of each of the first plurality of sessions.

Aspects of the above system include wherein the first component is configured to assign each of the received second plurality of sessions with the second QoS processing priority in response to instructions from the third component.

Aspects of the above system include wherein the generated expected runtime flow signature is offloaded by the third component to the second component.

Aspects of the above system include wherein the expected runtime flow signature is expected runtime dynamic session flow signature.

Aspects of the above system include wherein the instructions further cause the system to detect a congestion or overload experienced by the system is under a pre-determined threshold and remove the expected runtime flow signature.

Embodiments include a computer-implemented method, the method comprising: receiving, via one or more processors, a first plurality of sessions and a second plurality of sessions associated with a communication between a client and an in-vehicle application service, wherein the first plurality of sessions are authenticated sessions with a first quality of service (QoS) processing priority; assigning, via the one or more processors, each of the received second plurality of sessions with a second QoS processing priority that is lower than the first QoS processing priority; collecting, via the one or more processors, a flow signature of each of the first plurality of sessions and each of the second plurality of sessions associated with the communication between the client and the in-vehicle application service; generating, via the one or more processors, an expected runtime flow signature based on the collected flow signature of each of the first plurality of sessions associated with the communication between the client and the in-vehicle application service; comparing, via the one or more processors, the flow signature of each of the second plurality of sessions with the expected runtime flow signature based on a time at which each of the second plurality of sessions were received; promoting, via the one or more processors, the second QoS processing priority of a group of the second plurality of sessions to the first QoS processing priority; and dropping, via the one or more processors, the second plurality of sessions with the second QoS processing priority.

Aspects of the above method include wherein the flow signature of each of the first plurality of sessions includes information on virtual local area network, source Internet Protocol (IP) address, destination IP address, source port, destination port, sequence number, acknowledgement number, window size, selection of timestamp option, current timestamp, peer's used timestamp, hash key, cookies, selection of usage of cookie, hash signature inside timestamp option, or any combination thereof.

Aspects of the above method include wherein the generated expected runtime flow signature includes a sequence number range, an acknowledgement number range, or a combination thereof of an expected session that is expected to be received based on the time at which each of the second plurality of sessions were received.

Aspects of the above method include the method further comprising updating the generated expected runtime flow signature.

Aspects of the above method include the method further comprising: detecting a congestion or overload experienced by the system is under a pre-determined threshold; and removing the expected runtime flow signature.

Aspects of the above method include the method further comprising: writing a hashed key signature to a timestamp option in a first packet; sending the first packet; receiving a second packet; and comparing an echo timestamp of the second packet with the hashed key signature.

Aspects of the above method include wherein the method is performed by a first system component, a second system component, and a third system component, wherein the first system component is configured to receive the first plurality of sessions and the second plurality of sessions and assign each of the second plurality of sessions received at the first system component with the second QoS processing priority, wherein the third system component is configured to collect the flow signature of each of the first plurality of sessions and each of the second plurality of sessions and generate the expected runtime flow signature based on the collected flow signature of each of the first plurality of sessions, and wherein the second system component is configured to compare the flow signature of each of the second plurality of sessions with the expected runtime flow signature, promote the second QoS processing priority of the group of the second plurality of sessions to the first QoS processing priority, and drop the second plurality of sessions with the second QoS processing priority.

Aspects of the above method include wherein the expected runtime flow signature is expected runtime dynamic session flow signature.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a RAM, a ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably, and include any type of methodology, process, mathematical operation, or technique.

The term "electric vehicle" (EV), also referred to herein as an electric drive vehicle, may use one or more electric motors or traction motors for propulsion. An electric vehicle may be powered through a collector system by electricity from off-vehicle sources or may be self-contained with a battery or generator to convert fuel to electricity. An electric vehicle generally includes a rechargeable electricity storage system (RESS) (also called Full Electric Vehicles (FEV)). Power storage methods may include chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A system in a vehicle, the system comprising:
one or more processors; and
a memory storing instructions that, when executed by the one or more processors, cause the system to:
receive a first plurality of sessions and a second plurality of sessions associated with a communication between a client and an in-vehicle application service, wherein the first plurality of sessions are authenticated sessions with a first quality of service (QOS) processing priority;
assign each of the received second plurality of sessions with a second QoS processing priority that is lower than the first QoS processing priority;
collect a flow signature of each of the first plurality of sessions and each of the second plurality of sessions associated with the communication between the client and the in-vehicle application service;
generate an expected runtime flow signature based on the collected flow signature of each of the first plurality of sessions associated with the communication between the client and the in-vehicle application service;
compare the flow signature of each of the second plurality of sessions with the expected runtime flow signature based on a time at which each of the second plurality of sessions were received;
promote the second QoS processing priority of a group of the second plurality of sessions to the first QoS processing priority; and
drop the second plurality of sessions with the second QoS processing priority.

2. The system of claim 1, wherein the flow signature of each of the first plurality of sessions includes information on virtual local area network, source Internet Protocol (IP) address, destination IP address, source port, destination port, sequence number, acknowledgement number, window size, selection of timestamp option, current timestamp, peer's used timestamp, hash key, cookies, selection of usage of cookie, hash signature inside timestamp option, or any combination thereof.

3. The system of claim 1, wherein the generated expected runtime flow signature includes a sequence number range, an acknowledgement number range, or a combination thereof of an expected session that is expected to be received based on the time at which each of the second plurality of sessions was received.

4. The system of claim 1, wherein the instructions further cause the system to detect that the system is under a congestion or overload that is above a pre-determined threshold.

5. The system of claim 1, wherein the instructions further cause the system to update the generated expected runtime flow signature.

6. The system of claim 1, wherein the instructions further cause the system to:
write a hashed key signature to a timestamp option in a first packet;
send the first packet;
receive a second packet; and
compare an echo timestamp of the second packet with the hashed key signature.

7. The system of claim 1, wherein the system further comprises a first system component and a second system component, wherein the first system component is configured to receive the first plurality of sessions and the second plurality of sessions and assign each of the second plurality of sessions received at the first system component with the second QoS processing priority, and wherein the second system component is configured to compare the flow signature of each of the second plurality of sessions with the expected runtime flow signature, promote the second QoS processing priority of the group of the second plurality of sessions to the first QoS processing priority, and drop the second plurality of sessions with the second QoS processing priority.

8. The system of claim 7, wherein the system further comprises a third system component and the third system component is configured to:
collect the flow signature of each of the first plurality of sessions and each of the second plurality of sessions; and
generate the expected runtime flow signature based on the collected flow signature of each of the first plurality of sessions.

9. The system of claim 8, wherein the first component is configured to assign each of the received second plurality of sessions with the second QoS processing priority in response to instructions from the third component.

10. The system of claim 8, wherein the generated expected runtime flow signature is offloaded by the third component to the second component.

11. The system of claim 1, wherein the expected runtime flow signature is expected runtime dynamic session flow signature.

12. The system of claim 1, wherein the instructions further cause the system to detect a congestion or overload experienced by the system is under a pre-determined threshold and remove the expected runtime flow signature.

13. A computer-implemented method, the method comprising:
- receiving, via one or more processors, a first plurality of sessions and a second plurality of sessions associated with a communication between a client and an in-vehicle application service, wherein the first plurality of sessions are authenticated sessions with a first quality of service (QOS) processing priority;
- assigning, via the one or more processors, each of the received second plurality of sessions with a second QoS processing priority that is lower than the first QoS processing priority;
- collecting, via the one or more processors, a flow signature of each of the first plurality of sessions and each of the second plurality of sessions associated with the communication between the client and the in-vehicle application service;
- generating, via the one or more processors, an expected runtime flow signature based on the collected flow signature of each of the first plurality of sessions associated with the communication between the client and the in-vehicle application service;
- comparing, via the one or more processors, the flow signature of each of the second plurality of sessions with the expected runtime flow signature based on a time at which each of the second plurality of sessions were received;
- promoting, via the one or more processors, the second QoS processing priority of a group of the second plurality of sessions to the first QoS processing priority; and
- dropping, via the one or more processors, the second plurality of sessions with the second QoS processing priority.

14. The method of claim 13, wherein the flow signature of each of the first plurality of sessions includes information on virtual local area network, source Internet Protocol (IP) address, destination IP address, source port, destination port, sequence number, acknowledgement number, window size, selection of timestamp option, current timestamp, peer's used timestamp, hash key, cookies, selection of usage of cookie, hash signature inside timestamp option, or any combination thereof.

15. The method of claim 13, wherein the generated expected runtime flow signature includes a sequence number range, an acknowledgement number range, or a combination thereof of an expected session that is expected to be received based on the time at which each of the second plurality of sessions were received.

16. The method of claim 13, further comprising updating the generated expected runtime flow signature.

17. The method of claim 13, further comprising:
- detecting a congestion or overload experienced by the system is under a pre-determined threshold; and
- removing the expected runtime flow signature.

18. The method of claim 13, the method further comprising:
- writing a hashed key signature to a timestamp option in a first packet;
- sending the first packet;
- receiving a second packet; and
- comparing an echo timestamp of the second packet with the hashed key signature.

19. The method of claim 13, wherein the method is performed by a first system component, a second system component, and a third system component, wherein the first system component is configured to receive the first plurality of sessions and the second plurality of sessions and assign each of the second plurality of sessions received at the first system component with the second QoS processing priority, wherein the third system component is configured to collect the flow signature of each of the first plurality of sessions and each of the second plurality of sessions and generate the expected runtime flow signature based on the collected flow signature of each of the first plurality of sessions, and wherein the second system component is configured to compare the flow signature of each of the second plurality of sessions with the expected runtime flow signature, promote the second QoS processing priority of the group of the second plurality of sessions to the first QoS processing priority, and drop the second plurality of sessions with the second QoS processing priority.

20. The method of claim 13, wherein the expected runtime flow signature is expected runtime dynamic session flow signature.

* * * * *